US011880188B2

(12) United States Patent
Fowler et al.

(10) Patent No.: US 11,880,188 B2
(45) Date of Patent: Jan. 23, 2024

(54) INTELLIGENT DISTRIBUTION OF DATA FOR ROBOTIC AND AUTONOMOUS SYSTEMS

(71) Applicant: VIRGINIA TECH INTELLECTUAL PROPERTIES, INC., Blacksburg, VA (US)

(72) Inventors: Michael Fowler, Blacksburg, VA (US); Ryan Williams, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 474 days.

(21) Appl. No.: 16/979,913

(22) PCT Filed: Mar. 12, 2019

(86) PCT No.: PCT/US2019/021923
§ 371 (c)(1),
(2) Date: Sep. 11, 2020

(87) PCT Pub. No.: WO2019/178147
PCT Pub. Date: Sep. 19, 2019

(65) Prior Publication Data
US 2021/0011461 A1    Jan. 14, 2021

Related U.S. Application Data

(60) Provisional application No. 62/641,696, filed on Mar. 12, 2018.

(51) Int. Cl.
*G05B 19/4155*    (2006.01)

(52) U.S. Cl.
CPC ............ *G05B 19/4155* (2013.01); *G05B 2219/31207* (2013.01); *G05B 2219/50391* (2013.01)

(58) Field of Classification Search
None
See application file for complete search history.

(56) References Cited

U.S. PATENT DOCUMENTS

| 8,326,780 | B2 | 12/2012 | Gupta et al. |
| 8,655,822 | B2 | 2/2014 | Levchuk et al. |
| 2017/0124480 | A1* | 5/2017 | Sarkar ............... G06N 20/00 |

OTHER PUBLICATIONS

International Search Report and Written Opinion for PCT/US2019/021923 dated Sep. 19, 2019.

(Continued)

*Primary Examiner* — Ryan A Jarrett
(74) *Attorney, Agent, or Firm* — Perilla Knox & Hildebrandt LLP; Jason M. Perilla

(57) ABSTRACT

The present disclosure relates to the intelligent distribution of data for robotic, autonomous, and similar systems. To reduce the impact of multi-agent coordination on networked systems embodiments are disclosed that include the use of action-based constraints which yield constrained-action POMDP (CA-POMDP) models, and probabilistic constraint satisfaction for the resulting infinite-horizon finite state controllers. To enable constraint analysis over an infinite horizon, an unconstrained policy is first represented as a finite state controller (FSC). A combination of a Markov chain Monte Carlo (MCMC) routine and a discrete optimization routine can be performed on the finite state controller to improve probabilistic constraint satisfaction of the finite state controller, while minimizing impact to a value function.

20 Claims, 14 Drawing Sheets

(56) References Cited

OTHER PUBLICATIONS

Bernstein et al. "Policy Iteration for Decentralized Control of Markov Decision Processes", J. of Artificial Intelligence, vol. 34, 89-132 (2009).

Akselrod et al.; "Collaborative distributed sensor management for multitarget tracking using hierarchical Markov decision processes" pp. 669912-1-669912-14, 2007.

Bernstein et al.; "Bounded Policy Iteration for Decentralized POMDPs" in Proceedings of the nineteenth international joint conference on artificial intelligence (IJCAI), 2005, pp. 52-57.

Beynier et al.; "An Iterative Algorithm for Solving Constrained Decentralized Markov Decision Processes" In AAAI, vol. 6, 2006, pp. 1089-1194.

Capitan et al.; "Decentralized Multi-Robot Cooperation with Auctioned POMDPs" The International Journal of Robotics Research, vol. 32, No. 6, pp. 650-671, 2013. [Online] Available, http://ijr.sagepub.com/content/32/6/650.abstract.

Chamie et al.; "Finite-Horizon Markov Decision Processes with State Constraints" arXiv preprint arXiv: 1507.01585, Jul. 6, 2015.

D. J. Mackay; "Information Theory, Inference, and Learning Algorithms" Cambridge university press, 2003.

D. Koller and N. Friedman, "Probabilistic Graphical Models: Principles and Techniques." MIT Press, 2009.

E. Altman; "Constrained Markov Decision Processes" CRC Press, 1999, vol. 7.

Fargier et al.; "Uncertainty in Constraint Satisfaction Problems: a Probabilistic Approach" in European Conference on Symbolic and Quantitative Approaches to Reasoning and Uncertainty, Springer, 1993, pp. 97-104.

Feyzabadi et al.; "HCMDP: a Hierarchical Solution to Constrained Markov Decision Processes" in 2015 IEEE International Conference on Robotics and Automation (ICRA), May 2015, pp. 3971-3978.

Feyzabadi; "Risk-aware Path Planning Using Hierarchical Constrained Markov Decision Processes" in Automation Science and Engineering (CASE), 2014 IEEE International Conference on. IEEE, 2014, pp. 297-303.

Fowler et al.; "Constrained-Action POMDPs for Multi-Agent Intelligent Knowledge Distribution" In 2018 IEEE International Conference on Robotics and Automation (ICRA), 2018 [Accepted].

Girard et al.; "Concurrent Markov decision processes for robot team learning" Engineering Applications of Artificial Intelligence, vol. 39, pp. 223-234, 2015.

Hansen; "Solving POMDPs by Searching in Policy Space" in Proceedings of the Fourteenth conference on uncertainty in artificial intelligence. Morgan Kaufmann Publishers Inc., 1998, pp. 211-219.

Ison et al.; "Piecewise Linear Dynamic Programming for Constrained POMDPs" in AAAI, 2008, pp. 291-296.

Mesbah et al.; "Stochastic Nonlinear Model Predictive Control with Probabilistic Constraints" in American Control Conference (ACC), 2014, IEEE, 2014, pp. 2413-2419.

Omidshafiei et al.; "Decentralized Control of Partially Observable Markov Decision Processes using Belief Space Macro-actions" in 2015 IEEE International Conference on Robotics and Automation (ICRA), IEEE, 2015, pp. 5962-5969.

Pineau et al.; "Point-based value iteration: An anytime algorithm for POMDPs" in IJCAI, vol. 3, 2003, pp. 1025-1032.

Schiex; "Possibilistic Constraint Satisfaction Problems or "How to handle soft constraints ?"," in Uncertainty in Artificial Intelligence, 1992, Elsevier, 1992, pp. 268-275.

Seuken and Zilberstein; "Improved Memory-Bounded Dynamic Programming for Decentralized POMDPs" arXiv preprint arXiv; 1206.5295, 2012.

Tuna et al.; "Unmanned aerial vehicle-aided communications system for disaster recovery" Journal of Network and Computer Applications, vol. 41, pp. 27-36, 2014.

Undurti et al.; "An Online Algorithm for Constrained POMDPs" in Robotics and Automation (ICRA), 2010 IEEE International Conference on, IEEE, 2010, pp. 3966-3973.

Vlassis et al.; "Anytime algorithms for multiagent decision making using coordination graphs*" in Systems, Man and Cybernetics, 2004 IEEE International Conference on, vol. 1. IEEE, 2004, pp. 953-957.

Walsh; "Stochastic Constraint Programming" in ECAI, vol. 2, 2002; pp. 111-115.

Y. Li et al.; "Motion planning of multiple agents in virtual environment using coordination graphs," in Proceedings of the 2005 IEEE International Conference on Robotics and Automation, IEEE, 2005, pp. 378-383.

* cited by examiner

```
 1: procedure CONSTRAINTIMP(C, U, E, π₀)
 2:     π*, V*, Ω ← POMDP POLICY ITERATION(π₀)
 3:     N₀ ← CONSTRAINTEVAL(π*, C, U, E)
 4:     if N₀ ≥ η then
 5:         return π*, N₀
 6:     end if
 7:     π̂₀ ← π*;  t ← 0
 8:     repeat
 9:         t ← t + 1
10:         Π' ← ALLFEASIBLEREGIONS(π̂_{t-1}, Ω)
11:         π_min ← min_π π ∈ Π'
12:         g(Π') ← ||V*-POLICYEVAL(π_min)||
13:         Q ← Π'
14:         repeat
15:             Π' ← arg min_{q∈Q} g(q)
16:             π_max ← max_π π ∈ Π'
17:             f(Π') ← ||V*-POLICYEVAL(π_max)||
18:             N ← CONSTRAINTEVAL(π_max, C, U, E)
19:             R ← BRANCHCONTROLLER(Π', U)
20:             for R ∈ R do
21:                 π_min ← min_π π ∈ R
22:                 g(R) ← ||V*-POLICYEVAL(π_min)||
23:             end for
24:             Q ← Q ∪ R
25:             Q:Pop(Π')
26:             PRUNE(Q)
27:         until Q = ∅
28:         π̂_i ← arg max_{π∈Q} g(π)
29:     until π̂_i = π̂_i-1
30:     return π̂_i, N(π̂_i)
31: end procedure
```

*FIG. 4*

```
1: procedure CONSTRAINTEVAL(π*, U, A, C, B)
2:     repeat
3:         b_0 ← RANDOM(b ∈ B)
4:         i* ← arg max_{i∈π*} V_i · b_0
5:         x ← ∅
6:         repeat
7:             for i...T do
8:                 x ← x ∪ U(a_{i*})
9:                 i* ← RANDOMEDGE(p(o|i*), P^{(T)}(α))
10:            end for
11:            x(α) ← GAUSSIANFIT( x )
12:            if RANDOM(0,1) ≤ A then                ▷ Equation (1)
13:                P^{(T)}(α) ← x(α)
14:            end if
15:         until D(P^{(T)}; x) ≤ ε_D                  ▷ Equation (3)
16:     until Cov < ε_{cov}                            ▷ Equation (4)
17:     return ∫_{-∞}^{η∈C} P^{(T)} dx
18: end procedure
```

*FIG. 6*

INTELLIGENT DISTRIBUTION OF DATA FOR ROBOTIC AND AUTONOMOUS SYSTEMS

CROSS-REFERENCE TO RELATED APPLICATION

This application claims the benefit of and priority to U.S. Provisional Patent Application No. 62/641,696 entitled "INTELLIGENT KNOWLEDGE DISTRIBUTION," filed on Mar. 12, 2018, the contents of which being incorporated by reference in their entirety herein.

FIELD OF THE INVENTION

The present invention relates to artificial intelligence and autonomous systems. More specifically, the present invention relates to a decision framework that can be employed by one or more autonomous systems, such as autonomous vehicles, to determine what information should be sent to whom and when given various constraints, such as limited computing and networking resources available to a device or network.

BACKGROUND

Autonomous systems include those that are able to operate independently, for instance, without requiring manual control. Autonomous systems include unmanned aerial vehicles, autonomous "self-driving" vehicles, robotic devices, Internet of Things (IoT) devices, as well as other similar systems. Some autonomous systems are capable of communicating with others to achieve a common objective. Decentralized coordination between autonomous systems can require a delicate balance between common objectives and limited resources, such as power, bandwidth, computational resources, etc. The resilience of decentralized approaches is clear, allowing autonomous devices, referred to herein as "agents", to act independently with varying levels of information about states of other agents, as well as observations observed and actions performed by other agents.

For example, in disaster response or military operations, remote sensing by autonomous systems can provide a stream of data useful to emergency personnel over a network, such as the Internet. Disaster recovery and other active sensing regimes often rely on high-bandwidth links that are operated under heavy load while being subject to unpredictable channel and link qualities. The autonomous devices can include sensors that communicate data to one another, or to a central controller. The sensors can include, for example, electro-optical, chemical, and electronic sensors, among others. Communication can be necessary for multiple agents to coordinate operations while staying within operational constraints, for instance, as to not impact the sending and receiving of critical information. Along with typical bandwidth constraints, unmanned aerial vehicles (UAVs), for example, have the additional limitation of battery power that should to be preserved to maximize flight time.

J. Capitan et al., "Decentralized Multi-robot Cooperation with Auctioned POMDPs," The International Journal of Robotics Research, vol. 32, no. 6, pp. 650-671, 2013, proposes decentralizing multi-robot partially-observable Markov decision processes (POMDPs) while maintaining cooperation between robots using POMDP policy auctions. However, this operates on the assumption that point-to-point communications are "free," meaning communications use no resources, such as bandwidth, power, or computational resources. This further operates on the assumption that communications are instantaneous between nodes. However, it is understood that sending and receiving communications require computing resources and communications are not sent and received instantaneously. It remains problematic to have a system of autonomous devices interact with one another while communicating particular data in an efficient manner.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 4 is psuedocode describing an example of an algorithm for performing constraint improvement of an optimal finite state controller.

FIG. 6 is pseudocode describing an example of an algorithm for evaluating a finite state controller for probabilistic constraint satisfaction in accordance with various embodiments of the present disclosure.

DETAILED DESCRIPTION

Figure 1:
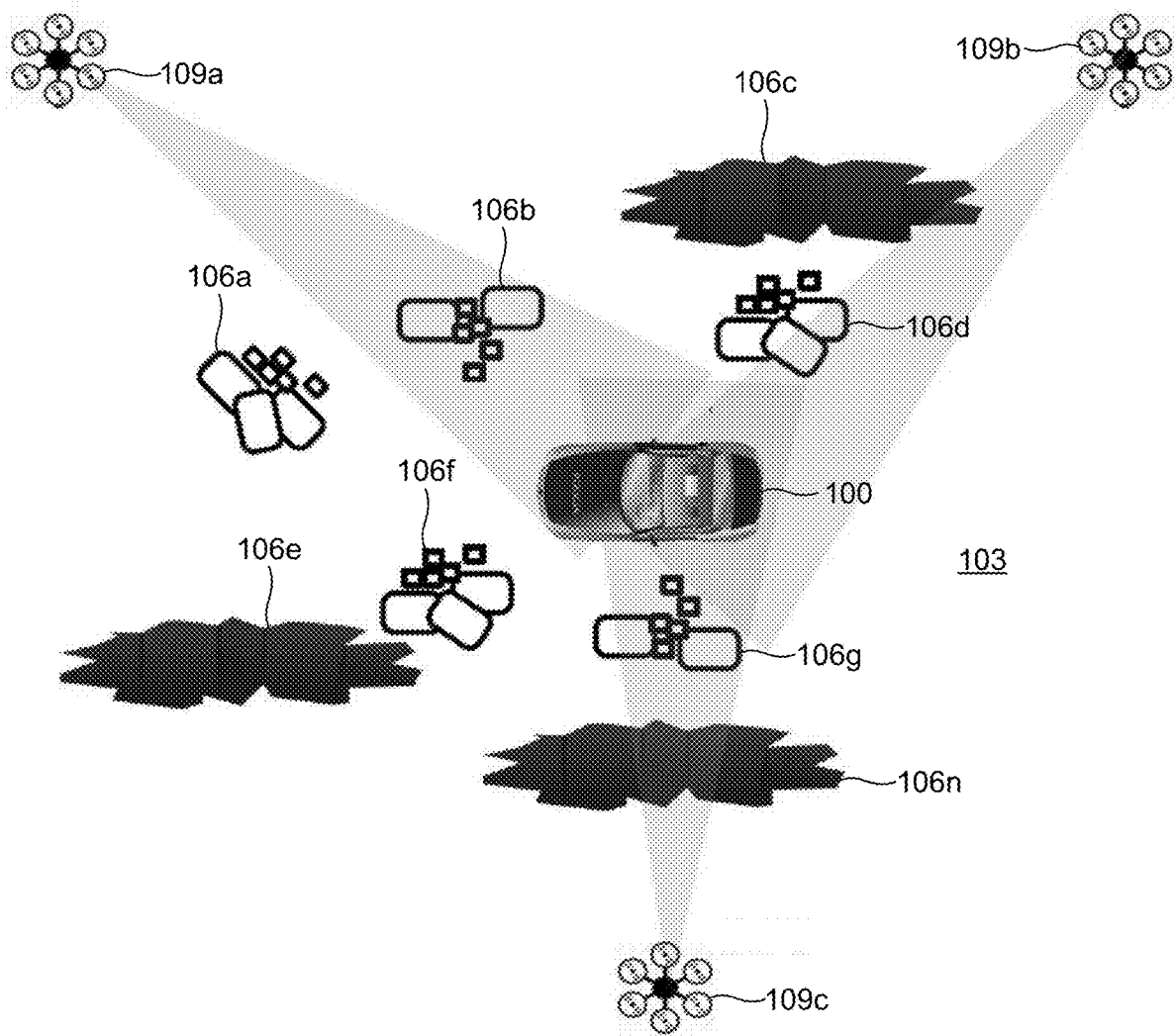
FIG. 1 is a schematic diagram illustrating an example situation in which an autonomous emergency vehicle traverses a disaster site with blocked views of potential hazards in accordance with various embodiments of the present disclosure.

The present disclosure relates to the intelligent distribution of data using artificial intelligence for robotic, autonomous, and other systems. According to various embodiments described herein, a framework for Intelligent Knowledge Distribution (IKD) is described for use in various computing systems, which determines what information is transmitted to whom and when, while constraining the impact coordination has on the limited resources available to each computing device.

In various embodiments, an agent application can execute in a computing device, which can include an autonomous vehicle, IoT device, or other device employing artificial intelligence or partial automation. In some embodiments, the agent application can execute as its own decision making routine and can execute in a decentralized or distributed multi-agent network. For instance, the agent application can oversee operation of autonomous devices or other agents using a decentralized partially observable Markov decision process (Dec-POMDP), where the agent has local state observations of itself, but local indirect observations of the environment and other devices.

Therefore, an autonomous device or other computing device executing the agent application can operate independently without the necessity of communicating or having information of other device's states or rewards. However, this can sometimes lead to non-ideal behavior. It is desirable to determine from local observations what information another agent will need at what point in time to improve the overall effectiveness of a coordinated objective while respecting resource constraints of fielded systems (e.g., instead of assuming communication are instantaneous and free).

According to various embodiments, systems and methods are disclosed for implementing a constrained-action partially-observable Markov decision process (CA-POMDP), comprising at least one computing device and program instructions executable in the at least one computing device that, when executed, direct the at least one computing device to: (1) generate an unconstrained policy through execution of a partially observable Markov decision process (POMDP) policy iteration routine; (2) generate a constrained policy by invoking a discrete and combinatorial optimization routine that applies at least one transformation to the finite state controller, the constrained policy generated comprising a finite state controller having a probabilistic constraint satisfaction threshold of operating within at least one operational constraint within a period of time; and (3) determine to perform an action based at least in part on a current state of the at least one computing device and the optimal finite state controller.

The at least one operational constraint can include at least one of: bandwidth, battery power, or a computing resource. In some embodiments, the policy iteration routine can include applying at least one transformation until a predetermined epsilon convergence is observed by: (1) selecting an epsilon value for detecting convergence of the unconstrained policy to the optimal constrained policy; (2) evaluating the unconstrained policy by solving a linear programming formulation for the value function for the unconstrained policy; (3) improving the unconstrained policy by applying a dynamic-programming update that generates a new set of candidate machine states for the unconstrained policy; (4) comparing a first plurality of vectors of the new set of candidate machine states to a second plurality of vectors of the unconstrained policy; and (5) modifying a finite state controller of the unconstrained policy until the epsilon-optimal finite state controller is determined.

The probabilistic constraint satisfaction routine can include modifying the optimal finite state controller to probabilistically satisfy at least one soft constraint by: (1) performing a branch-and-bound (BnB) routine to determine a set of constraint states to introduce into the optimal finite state controller; (2) introducing a plurality of constraint states into the optimal finite state controller; and (3) searching for a correct probability or a percentage of edges to redirect for a solution that satisfies at least one probabilistic constraint while minimizing impact to a value of the optimal finite state controller, the value determined using a value function.

The at least one computing device can be further directed to perform a sampling of the finite state controller and estimate resource utilization through a Markov chain Monte Carlo (MCMC) Metropolis-Hastings routine based on the sampling. In some embodiments, the actions described above can be performed in an autonomous device, such as an autonomous device comprising at least one microcontroller configured to oversee autonomous operation of the autonomous device. The autonomous device can further include at least one sensor and a network communication module. As such, the action can include performing at least one of: collecting sensor data using the at least one sensor; communicating the sensor data to another computing device; or moving from a first location to a second location. The autonomous device can be a first one a plurality of autonomous devices in the system, the another computing device comprising a second one of the plurality of autonomous devices. In some embodiments, at least a portion of the autonomous devices can include an unmanned aerial vehicle.

In various embodiments, the operations performed by the agent application can instead be realized as a library having a collection of routines. As a result, communication decisions are made independent of a joint agent policy and the library acts as an agnostic "plug-and-play" resource, as opposed to Dec-POMDP-Com that incorporate communications. Further, the library can mitigate combinatorial explosions while providing routines that can utilize information from other data models, such as concurrent MDPs.

In the following discussion, a general description of a constrained-action partially observable Markov decision process (CA-POMDP) routine is provided for use by agent applications, followed by a discussion of operation of the same.

Referring now to FIG. 1, a schematic diagram of an example emergency situation is shown according to various embodiments. More specifically, FIG. 1 shows an autonomous emergency vehicle 100 traversing a disaster site 103, where the autonomous emergency vehicle 100 has obstructed views of potential hazards 106a . . . 106n. The potential hazards 106 can include sinkholes, debris, or other hazards as can be appreciated.

Constrained-action POMDP for Intelligent Knowledge Distribution (IKD), as will be described, can be employed in monitoring of one or more ground assets, such as the autonomous emergency vehicle 100 as well as the unmanned aerial vehicles (UAVs) 109a . . . 109c, during a disaster response to ensure each of the autonomous emergency vehicle 100 and the unmanned aerial vehicles 109 safely avoid hazards and dangerous situations they might not be aware of from their perspective on the ground or in the air.

For instance, while the autonomous emergency vehicle 100 may potentially have accurate location information via a global position system (GPS) device, there are situations were GPS information in a disaster site is either unavailable or degraded due to obstructions or other factors. The actual location of the potential hazards 106 are not known and the monitoring vehicles need to maintain relative positioning. A ground asset, such as the autonomous emergency vehicle 100, needs to update its motion planning to optimize for hazards 106 as they are estimated by monitoring unmanned aerial vehicles 109.

The unmanned aerial vehicles 109 and/or the autonomous emergency vehicle 100 can each include at least one computing device, such as a microprocessor or other computing device having at least one hardware processor, memory, data bus, as well as other components of a computing device as can be appreciated. Further, the unmanned aerial vehicles (UAVs) 109 and/or the autonomous emergency vehicle 100 can each include an agent application that interacts with an autonomous controller that continuously navigates along a predefined search pattern around the disaster site 103 while communicating across a wireless network, such as a first responder mobile ad-hoc network (MANET).

In some embodiments, the agent application only tracks a single ground asset and, as such, each agent application needs to determine what sensor information needs to be shared among the devices to ensure they maintain situational awareness of the potential hazards 106 or other risks. For instance, the devices can provide a relative position warning to the unmanned autonomous vehicle 100 so that it can appropriately update edge costs of a motion planning algorithm executing thereon.

Thus, according to various embodiments of the present disclosure, a constrained-action partially-observable Markov decision process (CA-POMDP) is proposed for intelligent knowledge distribution that yields per-agent policies for distributing data with other agents based upon the value of information while also being subject to interaction constraints. As shown in FIG. 1 and as will be described, a case study in disaster recovery was performed with a heterogeneous multi-robot team of devices, although other systems and networks of autonomous vehicles or autonomous devices can be employed.

According to various embodiments, an optimal partially-observable Markov decision process (POMDP) policy is solved through policy iteration and through a combination of Markov chain Monte Carlo (MCMC) and discrete optimization, which can be applied to alter a finite state controller (also referred to herein as "a controller" for short) to probabilistically satisfy constraints. The embodiments described herein provide multiple advantages over prior systems.

First, a Monte Carlo simulation is performed that shows notable performance improvement as compared to intelligent, naive, and greedy communications. Second, Kalman filters are utilized as a state estimator which drive relevance and observation models for the value of information. Third, an improved discrete optimization routine is described that improves edge observation transitions performed in the CA-POMDP routine. Fourth, the CA-POMDP finite state controller policy is adapted with a Bayesian predictive estimation in response to real observation probabilities and resource utilization.

Constraints can include operational constraints, such as bandwidth, power, computational resources, or other operational constraints perceived by a computing device or an autonomous computing device. Power constraints can include, for instance, battery or generator power constraints. Computational resource constraints can include, for instance, memory, random access memory (RAM), disk, central processing unit (CPU), or other computational constraints. Operational constraints involve "soft" constraints over "hard" constraints. Hard constraints set conditions for variables that are required to be satisfied, whereas soft constraints, which have some variable values have a probabilistic guarantee of satisfaction if, and based on the extent that, the conditions on the variables are not satisfied.

In various embodiments described herein, soft constraints can be considered where a resulting infinite-horizon policy is evaluated to determine the probability a policy will not violate the soft constraints during a period of time. Soft constraints are often relevant in communication decisions compared to hard constraints for multiple reasons. Infinite-horizon POMDPs are often represented as a finite state controller and evaluating hard constraints on cyclic graphs is intractable due to the stochastic nature of the environment. Resource availability is often not a hard constraint over a short period of time, as a computing system is not utilizing the maximum instantaneous availability, and autonomous devices can focus on long-term resource availability as needed with battery power to maintain flight.

Further, it is desirable to have a system that provides useful information and a means to gauge accuracy of the CA-POMDPs models during intermittent communications. As such, in some embodiments, Kalman filters can be used to track state estimation of a ground asset and determine usefulness of information and accuracy of a disaster response use case for CA-POMDPs and IKD. As a result of the intelligent knowledge distribution framework described herein, unmanned aerial vehicles 109 or other autonomous vehicles can monitor a disaster site while satisfying various mission objectives, such as having a ground vehicle (e.g., the autonomous emergency vehicle 100) avoid potential hazards 106 while searching for survivors, while also drastically reducing the consumption of available resources. In comparison to naive and greedy communication models, the communication models described herein are able to maintain accurate state estimations of the autonomous emergency vehicle 100 while utilizing significantly less power and utilizing less bandwidth. In short, the embodiments described herein result in less power consumption and more efficient use of network bandwidth as compared to prior systems.

Notably, in the embodiments described herein, the assumption of free and instantaneous communications are removed and, instead, the effect of communications on use of computational resources are modeled, providing multi-device communication that operates within bounds of resource availability, thereby constraining solutions. Further, a knowledge distribution routine is described that is more precise than consensus, i.e., data flooding as opposed to sending particular data where it should be sent.

The primary objective of a constrained MDP (CMDP) routine is to identify policy that is within a restricted state, cost, or reward structure of an unconstrained MDP. Past approaches to constrained MDP and POMDP models apply constraints to a state-space of the model and projection into the value space. However, the embodiments described herein implement action-based constraints, as utilization of resources is limited that an action consumes which cannot be tied to physical constructs, such as states that represent "no-fly" or "stay-away" zones. As many scenarios require an indefinite length of operation and because no predefined goal states are maintained, the ability to define finite or indefinite horizons can be difficult or impossible.

Therefore, in various embodiments, the CA-POMDP routine is solved as an infinite-horizon policy, which provides flexibility and versatility when used for various applications. POMDPs that require infinite-horizon policy convergence are solved by policy iteration and therefore represented as a finite state controller. A finite state controller can be represented graphically as a cyclic graph, which describes how the finite state controller will utilize resources it consumes in order to satisfy soft constraints. It is understood that the finite state controller described herein can be embodied in software, hardware, or a combination thereof.

The modeling of multi-agent systems (MAS) that have common objectives and a common reward can be represented as a Decentralized Markov decision processes (Dec-POMDP). A Dec-POMDP is a construct that allows multiple independent POMDPs running on different devices to act independently while working towards an objective function that is dependent on actions of the devices. In brief, each device only has access to local observations (and not global observations) while objectives and rewards are dependent on the devices collectively. As the objective function is dependent on the behavior of all the devices in distributed and collaborative models, the devices have no information on the state of the other devices, and each device needs to generalize the belief states to account for their belief of policies of other devices. Unlike Dec-POMDP with Communications (Dec-POMDP-Com), the CA-POMDP framework described herein does not utilize communications to inform a joint policy of multiple devices driving communications, but more relevantly the framework described herein include an agnostic "plug-and-play" library or agent application that separates the task of a device from a communication decision while enforcing constraint satisfaction not as a cost of communication.

Partially Observable Markov Decision Routine.

A Markov decision process (MDP) includes a discrete time stochastic control routine or process that provides a framework for modeling decision making in situations where outcomes are partially random and partially under the control of a decision maker, such as an autonomous device. As such, MDP models can be used to determine the best actions to perform over a time horizon based upon the current state of the system, s, the probability of transition to another state T(s'|s, a), and the reward, R, associated with a state and action, R(s, a). MDP models can be used to determine optimal actions that, when performed, provide a reward that can be delayed or realized at some future point in time. As such, in various embodiments, an autonomous device or other agent can implement an MDP model to determine a set of actions, or a "policy" ($\pi$), that achieves a reward.

If the state of a device is not fully observable, then the system becomes a partially observable MDP (POMDP) where belief states, b∈B, are used to represent the probability distribution of being in any particular state based upon observations. These belief states can be tied to an observation model, O, that maps the probability of being in a state based upon what was observed. Formulating a POMDP in this form is often referred to as a belief-state MDP. A POMDP can be described formally by the vector <S, O, B, A, T, R, Π>, where S is the set of states an agent can be in, A is the set of actions the agent can take, T is the set of transition probabilities T(s'|s, a) between states based on an action a∈A, R is the set of rewards R(s, a) for taking an action in a state, and H is the set of policies, $\pi$, that are feasible consisting of a set of vectors of actions, $\{\pi_0, \pi_1, \ldots, \pi_t\}$. The objective is to select a policy 7, that maximizes the expected utility over time: $\pi^*(s) = \arg\max_\pi U^\pi(s)$.

Figure 2:
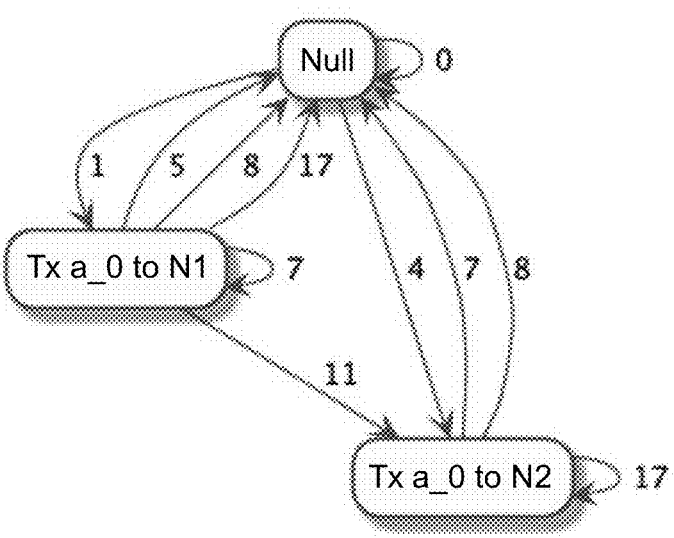
FIG. 2 is a graphical representation of a finite state controller for a partially observable Markov decision process (POMDP) policy in accordance with various embodiments of the present disclosure.

In instances in which a current state of a device is not known, the device can maintain a belief b. An immediate one-step policy can select an action that maximizes the expected reward $\max_a \Sigma_s b(s) R(s, a)$. Assuming $a_a$ represents R(•, a) as a vector, often referred to as an alpha vector (and the current belief state b is a vector as well), then an immediate one-step policy becomes $\max_a a_a b$. An alpha vector then represents a hyperplane in the belief space that is piecewise linear and convex. FIG. 2 shows an example of a simple policy, $\pi$, represented as a finite state controller. The finite state controller of FIG. 2 is visually depicted as a directed cyclic graph with the vertices v∈V representing machine states consisting of an action a∈A per vertex and edges e∈E representing transitions from an action of machine state $a_i$ to an action of machine state $a_j$ determined by the observation o∈O seen after executing that action $a_i$. However, it is understood that the finite state controller can be implemented as a code routine by an agent application, or as hardware (e.g., integrated circuit). An action $a_i$ of machine state i can be the same action $a_j$∈A of another machine state j such that $a_i = a_j$: (i, j)∈V($\pi$), though they will consist of unique dominant alpha vectors, $a_i \neq a_j$.

In various embodiments, a finite state controller can be generated as an unconstrained policy and the finite state controller can thereafter be improved through a policy iteration routine. In some embodiments, the policy iteration routine can include the routine described in, E. A. Hansen, "Solving POMDPs by searching in policy space," in Proceedings of the Fourteenth conference on Uncertainty in Artificial Intelligence, Morgan Kaufmann Publishers Inc., pp. 211-219 (1998), the contents of which being incorporated by reference in its entirety herein. As such, the policy iteration (PI) routine can improve a finite state controller through transformations which searches within a policy space until an epsilon convergence is observed. In particular, a dynamic programming update can be iteratively used to generate a new set of candidate machine states that a policy improvement loop can use to compare alpha vectors of existing value function V and the new value function V', and modify the finite state controller accordingly. The set of alpha vectors can be run through a linear programming (LP) formulation to prune the set of vectors that are dominated in the belief space by any combination of other alpha vectors.

Markov Chain Monte Carlo Routine.

To analyze the finite state controller policy that results from solving a POMDP for probabilistic constraint satisfaction, a Markov chain Monte Carlo (MCMC) sampling routine can be applied. A MCMC is a particle-based approximate inference sampling technique that uses a sequence of samples to iteratively approach a desired posterior distribution. For CA-POMDPs, the MCMC provides a routine for continuously sampling the finite state controller policy seeking a posterior that represents its resource utilization. When samples are initially likely to be from the prior distribution, the sampling of a sequence of samples will successively approach the posterior, whereas likelihood based approaches are unlikely to account for this fact and place undue weighting on earlier samples.

Another gain in utilizing MCMCs for determining posterior distributions includes the versatility in the type of distribution that can be inferred while not being bound to Gaussian distributions or Gaussian approximations. In some embodiments, the MCMC routine can include the Metropolis-Hastings routine, which is beneficial due to difficulties in direct sampling from the probability distribution of a cyclic controller and calculating the normalizing factor of the distribution. The Metropolis-Hastings routine uses a random walk approach that either accepts or denies a proposal rather than tracking importance weights. The acceptance ratio can be reduced to:

$$\mathcal{A} = \frac{P(x|\mu)P(\mu)}{P(x|\mu_0)P(\mu_0)}, \quad \text{(eq. 1)}$$

of the proposed posterior distribution, $P(x|\mu)P(\mu)$, over the current posterior distribution, $P(x|\mu_0)P(\mu_0)$. The most difficult part of calculating the posterior with the Bayes formula, the evidence $P(x)$, is common to both the proposed and current posterior and therefore conveniently cancels out.

If a random number generated from a uniform distribution (0, 1) is lower than the acceptance ratio, then the proposed posterior can be accepted. In cases where the proposed distribution is larger than the current distribution, then the acceptance ratio will be greater than one $\mathcal{A} \geq 1$ and, therefore, the proposed distribution will always be accepted. On the contrary, when the acceptance ratio is less than one $\mathcal{A} < 1$, then a random uniform probability exists that will accept the proposed distribution.

Graph Theory.

In some embodiments, a model can be employed for interactions in a decentralized multi-robot system. Consider a multi-robot system composed of n robots with indices I={1, ..., n}, operating in $\mathbb{R}^d$, each having position $x_i \in \mathbb{R}^d$. As an example for determining collaboration between autonomous devices or similar agents, it can be assumed that robots or autonomous devices can intercommunicate in a proximity-limited way, inducing interactions (topology) of a time varying nature. Specifically, letting $d_{ij} \triangleq \|x_{ij}\| \triangleq \|x_i - x_j\|$ denote the distance between robots i and j, and (i, j) includes a link between connected robots, the spatial neighborhood N of each robot is defined by the interaction radius ($x_i$), which has a dependence on the location of robot i. Note that such an interaction radius encodes typical sensing and communication constraints that vary spatially, and will model robot-to-robot communication capabilities. The assumed spatial interaction model is formalized by the directed graph, G=(I, E) with nodes indexed by the robots, and edges $E \subseteq I \times I$ such that $(i, j) \in E \leftrightarrow \|x_{ij}\| \leq p(x_i)$. The interaction graph G of a decentralized multi-robot system describes the neighbors $N_i$ that an agent i (e.g., an autonomous device) transmits information in IKD collaboration.

Constrained-Action POMDP.

The constrained-action POMDP as described herein can include a routine that determines a near optimal policy in a partially observable environment with action-based constraints that are probabilistically guaranteed to stay within specified soft limits. Therefore, the routine first determines an unconstrained optimal policy, where the unconstrained optimal policy can be represented as a finite state controller. Thereafter, the routine improves the probabilistic constraint satisfaction of the finite state controller. Any action performed by an autonomous system will have a probabilistic distribution representing the utilization of resources, therefore the probability that any series of actions will stay under a soft constraint can be determined based on an analysis of the cumulative distribution function (CDF). In the formulation of the CA-POMDP, an analysis of probabilistic constraint satisfaction is performed by sampling a policy with Markov chain Monte Carlo and improving the constrained policy through discrete optimization.

Ca-POMDP Model.

It is desirable to adapt an infinite-horizon finite state controller of a POMDP policy from policy iteration to probabilistically stay within soft constraints within a desired period of time T, $p(\Sigma_{t=0}^T u(at) \leq c)$, where $\leq$ is a piecewise comparison of constraint bounds $\forall_c \in C$ and u is the resources used by the action at $a_t$. As noted above, policies can be represented as a finite state controller, as a finite state controller can be modeled as cyclic graph that represents an infinite-horizon POMDP. The finite state controller also can accelerate the convergence to a policy as an infinite horizon policy in value iteration is not guaranteed to converge. The CA-POMDP model implemented by one or more routines can be described formally by the tuple <S, O, B, A, T, R, Π, H, C, U, E > where S, O, B, A, T, R, and Π are the same as defined above in POMDP, H is the set of resources being used by the agents, C is the matrix defining the constraints for each resource, U is the matrix that defines the utilization of resources for an action $a \in A$ and its variation or uncertainty, and E is the matrix of edge observation probabilities for transitioning from a machine state i to another machine state j based upon action observation histories (AOH). It is understood that the tuple can include inputs and/or outputs of the CA-POMDP routine.

The constraint model consists of a vector of soft constraints C (e.g., power and bandwidth), the utilization of resources U per time epoch $\Delta t$, and the matrix of observation probabilities E. $C \in \mathcal{R}^{|H| \times 2}$ is a matrix representing the desired soft constraint within a specified time period or epoch T where each row $h \in H$ of C is the vector $[c_h, \eta_h]$, $c_h$ is the desired constraint for resource h, and $0 < n_h < 1$ is the probabilistic constraint satisfaction for that resource based upon operational scenarios. The resource utilization U: $|A| \times |H| \times 2$ of each one of the resources, $h \in H$, is defined as a vector describing the parameters of a Gaussian probability distribution per action and resource, $u(a, h) \leftarrow N(\mu, \sigma)$. The matrix E: $|\pi| \times |O|$ consists of edge observation probabilities $p(o|a_{i \in \pi})$ for encountering an observation $o \in O$ while at a machine state i of the finite state controller policy $\pi \in \Pi$. Edge observation probabilities are tied to the finite state controller policy representation as a mode of tracking track the stochastic nature of the environment causing observation transitions from one machine state to another. Their probabilistic distribution is initially assumed to be uniform and the true distribution can be learned.

A mechanism in CA-POMDP is the finite state controller representing the optimal policy calculated using the policy iteration routine along with discrete optimization. In discrete optimization, CA-POMDP can introduce constraint states j into the finite state controller to bring the finite state controller within a probabilistic constraint satisfaction η that can be analyzed by MCMC while minimizing the impact on the optimal value function V*. To effectively alter the controller with constraint states, a set of the best alpha vectors per action Ω are maintained during the dynamic programming updates for later consideration that though not dominant at any dynamic programming update can utilize less resources and therefore should be considered to improve the controller for probabilistic constraint satisfaction.

Constraint Improvement Routine.

In various embodiments, constraint improvement of the existing epsilon-optimal (or $\epsilon$-optimal) policy can be performed using a branch-and-bound routine, or a slight variant thereof, which comprises a technique for discrete and combinatorial optimization. The branch-and-bound routine can be employed to determine a set of constraint states (the previously stored set of alpha vectors $\Omega$) to "inject" or insert into the optimal finite state controller which utilizes less resources than one of the existing machine states in the finite state controller, while minimizing the loss in the expected value from $\epsilon$-optimal.

The algorithm initializes with the $\epsilon$-optimal finite state controller policy $\pi^*$ calculated from policy iteration which can be checked thereafter to determine if the probabilistic constraint satisfaction $N_0$ of the optimal policy is compliant. If it is not, the root of the branch-and-bound tree Q is the feasibility space of an ordered combinatorial set of all substantiations of machine states, constraint states, and edge redirection variables, as shown in FIG. 3.

Figure 3:
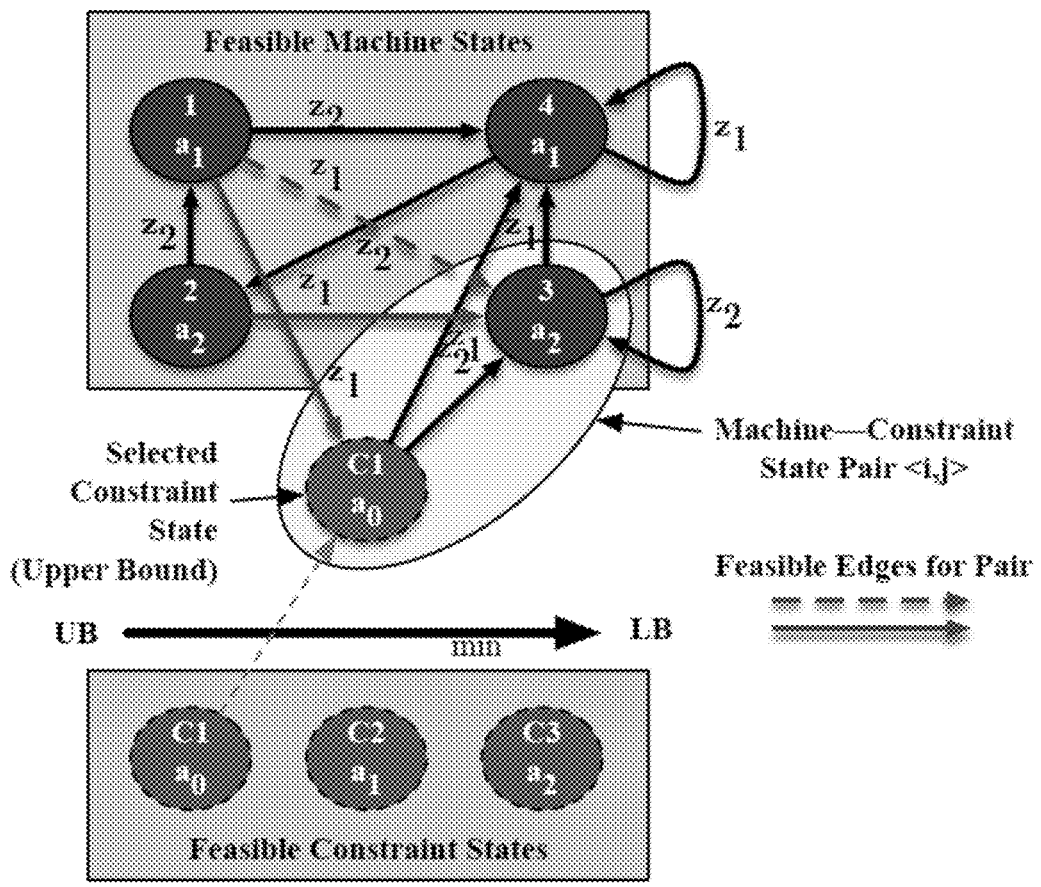
FIG. 3 is a diagram showing feasible regions for a finite state controller for use in a branch-and-bound discrete optimization routine in accordance with various embodiments of the present disclosure.

The first variable in the feasibility region is the set of existing machine states i in the policy $\pi_{t-1}$ shown in the upper box of FIG. 3, which is initially $\pi^*$. Each machine state's i dominant region $V_i b_i$, where $b_i$ is the region in the belief space b that machine state i has dominance over all other machine states, is used in creating an ordered set of machine-constraint state pairs, marked in FIG. 3. The set of alpha vectors $\Omega$ saved from the policy iteration algorithm is the second variable that is paired with a feasible machine state. Each alpha vector becomes a potential constraint state j, shown in the lower box of FIG. 3, that can be introduced into the controller and will result in a loss of value depending on the value of the new alpha vector and edge redirection. A feasible constraint state j is an alpha vector whose action $a_j$ utilizes less resources $U(a_j) < U(a_i)$ than machine state i. The upper $f(\pi)$ bound and lower bound $g(\pi)$ of a constraint state and machine state pair <i, j> is the pair that provides the maximum (UB) and minimum (LB) value difference between the constraint state's alpha vector $V_j b_i$ and the machine state's $V_i b_i$ for the machine state's dominant region $b_i$: $\|V_i b_i - V_j b_i\|$.

The last variable in the feasibility region is the set of viable edge redirection probabilities. During the branch-and-bound routine, the feasible constraint states for a particular machine state pair <i, j> are injected into the controller and the edges leading to this new constraint state from other machine states already in the controller are selected as either maintaining their transition to the existing machine state i or redirecting to the new constraint state j. The edge redirections are solved for last and until then a simple assumption is made for the calculation of upper and lower bounds for machine-constraint state pairs. The lower bound function assumes that none of the edges are redirected which results in a controller that has no value impact. The upper bound assumes all edges are redirected to the constraint state, which causes the greatest impact on the value function as the original machine state that dominated has been completely substituted or replaced by the constraint state that maximizes $\|V_i b_i - V_j b_i\|$.

The lines in FIG. 3 indicate feasible edges that could be redirected or maintained for the <3, C1> machine-constraint pair. The constraint state inherits the outgoing edges of the original machine state i since the outgoing edges already transition to dominant machine states after a belief update, and any constraint state introduced into the controller has already been determined to be non-dominant. Redirecting an edge from another machine state $k \in \pi_{k \neq 1}$ to the new constraint state is not trivial due to the combinatorial explosion, which drastically reduces the computational efficiency, and determining an ordered set of the expected value of a transition proved unreliable. Therefore, the feasibility region is the probability of redirecting an edge from an original machine state to the new constraint state defined as a vector of ordered discrete probabilities $\vec{P} = [p_0, p_1, \ldots, p_n]$ where $p_0 < p_1 < \ldots < p_n$ and $0 < p_i < 1$. The branch-and-bound routine can identify the correct probability $p_i \in \vec{P}$, or percentage of edges, to redirect for a solution that satisfies probabilistic constraints while minimizing the impact to the value of the constrained controller.

As the probability increases, more edges from an existing machine states k in the controller to the machine state i will be redirected to the constraint state j. Formally, the brand-and-bound routine minimizes an impact of the constrained controller value $V(\hat{\pi})$ from the optimal controller $V^*$ while satisfying that the constrained controller's probabilistic constraint satisfaction $N(\hat{\pi})$ is greater than or equal to the soft constraints $\eta \in C$ $$\text{Objective: } \min_{\hat{\pi}} \|V^* - V(\hat{\pi})\| s.t. N(\hat{\pi}) \geq \eta \forall_\eta \in C \quad \text{(eq. 2).}$$

During each step of the algorithm, a set of feasible solutions $\Pi'$ is removed from the tree Q based on a priority metric (best-first search) provided by the lower bound function $g(\Pi')$, as shown in line 12 of FIG. 4. The branching function, shown in line 18 of FIG. 4, divides the region of feasible solutions in half, similar to constrained integer programming, creating two new nodes $\Pi'$ in the tree Q until there is no region to divide creating a "leaf" node. The probabilistic constraint satisfaction N of the upper bound policy $\pi_{max}$ of a node $\Pi' \in Q$ is evaluated via MCMC, as shown in line 17 of FIG. 4, which will be discussed in great detail below, to identify the best satisfaction the worst finite state controller can provide. The pruning function, shown in line 19 of FIG. 4, can remove any node in the tree where (i) the lower bound of that node is greater than the upper bound of any other $g(\Pi_i') < f(\Pi_i') \forall (i, j) \in Q_{i \neq j}$; or (ii) the upper bound does not meet the constraint satisfaction $N_i < \eta \forall_i \in Q, \eta \in C$.

There are two loops in the constraint improvement algorithm with the inner loop terminating when there are no further nodes to consider in the tree Q, as shown in line 20 of FIG. 4. The outer loop, line 22, introduces a single constraint state during each loop until the desired probabilistic constraint satisfaction has been achieved. Afterwards, a constraint state can be introduced into the finite state machine with an objective to increase the value function without violating the constraint. Once there are no changes to the controller to improve constraint satisfaction or value function, the function returns the new finite state controller.

Figure 5:
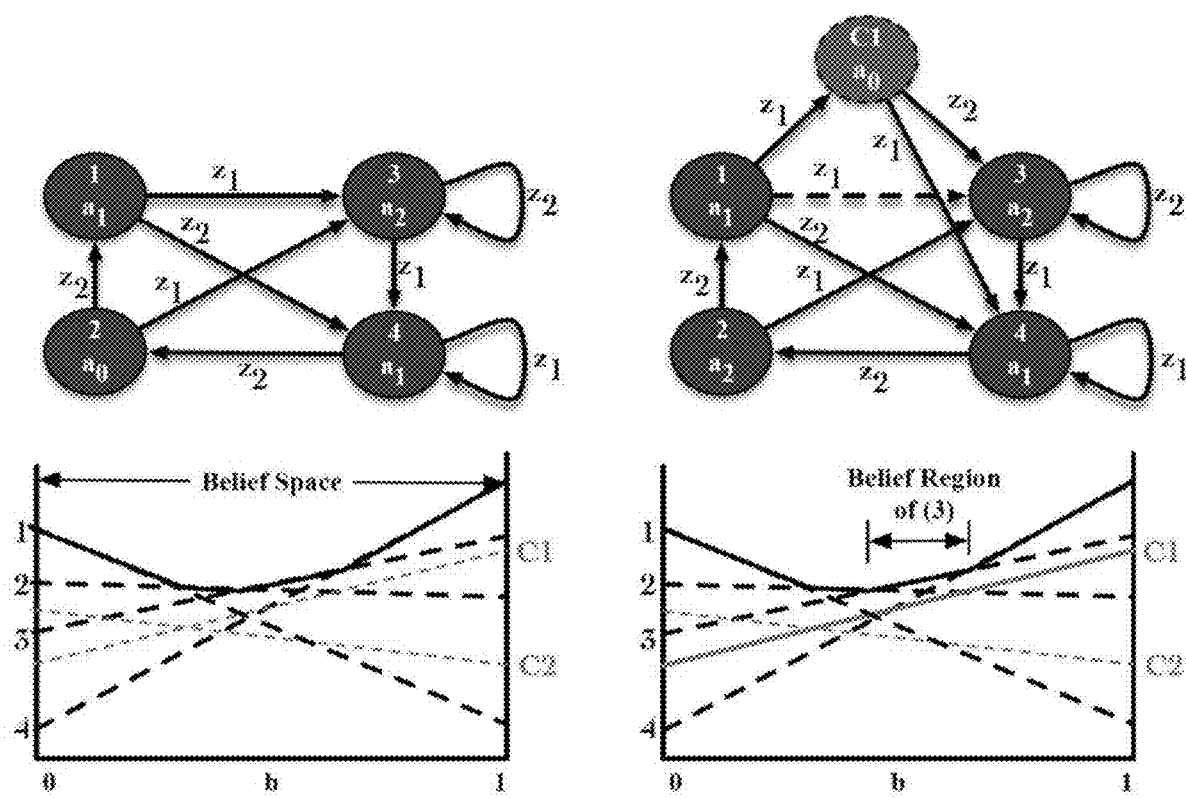
FIG. 5 is a schematic diagram showing a constraint being injected into a controller to reduce resource utilization of a machine state in accordance with various embodiments of the present disclosure.

FIG. 5 provides an example of a constraint improvement step with the original optimal finite state controller shown on the left with machine states 1 through 4. Notice that the machine states 1 and 4 have the same action, $a_1$, which is an indicator that the same action during policy iteration was dominant in two different belief regions. During the constraint improvement, the branch and bound is analyzing the possibility of a constraint state C1 concurrent with machine state 3 utilizing action $a_0$, which utilizes less resources than action $a_2$. C1 was initially selected because C1 has the greatest value in the same belief region as 3, since in a best-first search it minimizes $\|V_3 b_3 - V_{C1} b_3\|$ and can be seen in the red line of the right graph of FIG. 5. If C1 fails to satisfy the constraints, then the algorithm will examine using C2 assuming C2 utilizes less resources then C1.

The edge redirection function has selected to redirect the edge (1,3) to constraint state C1 and C1 inherits the outgoing edges from machine state 3. It is important to note that the loop at machine state 3 for observation $z_2$ does not create a loop in C1 for $z_2$ but is directed to the original machine state $1^3(a_2, z_2)=3 \rightarrow 1^{C1}(a_0, z_2)=3$ since 3 is the dominant machine state for the belief update of $z_2$ and to prevent a possible non-optimal cyclic loop in the finite state controller.

Constraint Satisfaction Evaluation.

Evaluating constraint satisfaction, shown in FIG. 6, is accomplished by random sampling of the finite state controller to estimate the resource utilization through a Markov chain Monte Carlo (MCMC) Metropolis-Hastings routine. Using the length of time or epochs over which the constraints are being applied T, the finite state controller is sampled T=t times, where an action is taken every t, by Monte Carlo following the edge transitions around the controller from a random initial machine state recording the Gaussian parameters N(σ, μ) for each machine state visited. The Gaussian parameters are combined into a sample x that represents the total mean and deviation of resource utilization for the entire time period T. This is repeated from the same initial machine state to gather a sequence of samples x(α) until the chain has approached a representative posterior $P^T(\alpha)$ of the finite state controller resource utilization for that particular initial machine state, where α represents the distribution of sample data. The posterior has been considered "mixed" when the variational distance is within epsilon (line 12)

$$D(P^{(T)}; x) = \max_{\alpha}|P^{(T)}(\alpha) - x(\alpha)| \le \epsilon. \quad \text{(eq. 3)}$$

To determine when the routine needs to stop taking samples from random initial machine states, the algorithm continues until the auto-covariance of the lagged MCMC distributions, a generalization of the central limit theorem to Markov chains, has converged:

$$Cov[P^{(T)}[m]; P^{(T)}[m+l]] \approx \quad \text{(eq. 4)}$$
$$\frac{1}{M-l}\sum_{m=1}^{M-l}([m] - \hat{E}(m))(P^{(T)}[m+l] - \hat{E}(m+l)),$$

where M is the set of samples collected, l the number of samples to lag, $P^{(T)}$ is the vector of $P^{(T)}(\alpha)$, and $\hat{E}(\bullet)$ is the unbiased estimator $$\frac{1}{M}\sum_{m=1}^{M} P^{(T)}(m).$$

Once the MCMC has terminated, the resource utilization posterior distribution is used to determine the probability that a finite state controller is within the cumulative distribution function (CDF), $\int_{-\infty}^{n} N(\mu, \sigma)dx$, which is our probability of satisfying the soft constraint.

Edge Probabilities and Resource Utilizations Routines.

When sampling the finite state controller during the evaluation of constraint satisfaction, an observation edge o is randomly chosen during each of the samples with a probability $p(o|a_i)$ depending on the action a of machine state i. This Monte Carlo sampling of observation edges through the controller is initially a uniform a priori distribution, but the actual conditional probability of an observation given an action during operation needs to be learned so that the controller can be updated to ensure proper constraint satisfaction as the environment changes. Edge probabilities of an observation o given an action a is a discrete finite set of possibilities known as a categorical distribution (aka, a generalized Bernoulli or multinoulli distribution), which is used to represent the likelihood of the data observations. The conjugate prior of a multinoulli distribution is a Direchlet distribution, which is also a Jeffrey's Prior for an N-sided die with biased probabilities, $\vec{\gamma} = (\gamma_1, \ldots, \gamma_n)$. The closed form solution for calculating the posterior distribution for the categorical distribution and a Direchlet prior is $$p(o | A) = \frac{c(o, a) + \alpha(o, a)}{\sum_{j=1}^{|c(j)|} c(o, j) + \sum_{j=1}^{K} \alpha(o, j)}, \quad \text{(eq. 5)}$$

where c is the a priori count for an observation o with state action a, a the observed occurrence of observation o, and K the total number of occurrences seen. This method allows a deployed system to track the relationship between actions and observations over time and then recalculate a constrained policy to maintain constraint satisfaction or maximize the value of the controller if it is utilizing less resources than expected.

Another consideration in adapting the controller for constraint satisfaction is validating the a priori resource utilization models are still applicable during operation. Situations in the field change over time and the initial a priori models used for resources will not be valid during the entire operational life of the autonomous system. As an example, as the battery of an autonomous system is drained during its operation, an action can consume more battery power than when the battery is fully charged. To track the resource utilization, a simple Bayes estimator with Gaussian priors and likelihood is used to track the current resource utilization per action.

It is problematic to continuously update the controller with every edge observation or resource distribution change due to limitations in computational resources and to prevent short-term instabilities or unpredictability in the controller; however, it is still desirable to ensure constraint satisfaction or improve the finite state controller value. To define an appropriate trigger for re-computing a new controller, the information theoretic concept of Variation of Information is utilized. When the variation of information $$d(X, Y) = H(X | Y) + H(X | Y), \quad \text{(eq. 6)}$$

$$H(X | Y) = -\Sigma_{i,j} p(x_i, y_i) \log \frac{p(x_i, y_i)}{p(y_i)} \quad \forall\, i \in X, j \in Y, \quad \text{(eq. 7)}$$

exceeds a desired threshold, the routine can re-compute a constrained finite state controller from the precomputed optimal controller, where X is either the a priori probability distribution of edges E or resource utilization U and Y is the associated probability distribution of the learned distribution. When the learned distributions are significantly different than those previously used to compute a constrained FSC, the finite state controller can be recomputed with the new learned probability distributions.

Intelligent Knowledge Distribution Model.

Intelligent Knowledge Distribution (IKD), as described herein, can include applying a constrained-action POMDP to control communications between multiple independent agents, or autonomous device, that must stay within quality of service limitations. The goal of IKD is to answer the questions: what information should we send, when should we send it?, and to whom should we send it to?

Action and State Model.

The IKD model builds on the CA-POMDP formulation by extending the CA-POMDP tuple to include $<\Sigma_i, I, N_i, F>$, where it can be assumed that each agent independently runs CA-POMDP. Each agent i has a set of neighbors $N_i$ in the environment that can actively collaborate. The $\Sigma_i$ is the alphabet of communications $\sigma_k \sqsubset \Sigma_i$ that agent i can transmit to a neighbor $j \in N_i$. F is a set of states $s \in S$ that place mission objectives at risk of failure. Therefore, the set of actions $A_i$ for an agent i is a discrete decision from a combinatorial set to transmit the information learned to agent $j \in N_i$, denoted as action $a_k^j$ related to the information $\sigma_k$ $$A_i = \{\cup_{j \in N, k \in I} a_j^n \to \{0,1\} \cup \emptyset\} \quad \text{(eq. 8)},$$

along with the single Ø (or Silence) action to not transmit at all.

The states of the IKD model are a combinatorial set involving the state of relevance $S_r$ of the locally observed information and state of collaboration $S_c$ with its cooperative neighbors. Relevance is a set of discrete states that the information is relevant (or important) and timely per global mission objectives, and are calculated per agent on its local observations only. The confidence of an agent in its current collaboration with its neighbors $N_i$ is a set of discrete states indicating a level of confidence that the current level of communication will maintain the ability for the agents to cover global mission objectives by sharing local observations. Formally, the set of states for an agent i in the IKD model:

$$S_i = \cup_{s_r, s_c \in S} \{s_r^{k=1}, \ldots, S_r^{k=|I|}, s_c^{n=1}, \ldots, s_c^{n=|N|}\} \quad \text{(eq. 9)}$$

is a combinatorial combination of a set of relevance states $s_r^k$ for each set of information k being tracked by the agents and a set of collaboration states $s_c^n$ with a neighbor $n \in N$ indicating whether the neighbor is "up to date" with the relevant information to the overall objectives of the system. A single state in the combinatorial set therefore becomes a representation of how important the information is and how long it has been since the agent has communicated with each agent.

Reward Model.

The reward functions for IKD needs to be defined specifically by the model designer or learned online, but follows some basic constructs defined here. The reward for relevance $\hat{R}_r(s, a)$ is a normalized reward based upon the joint product of (a) the likelihood L that the next state s' is not approaching a critical point $f \in F$ where global mission objectives are at risk when taking action a in state s, which is either known a priori or learned online, and (b) the information theoretic metric on the maximal value of the information ρ(k) it could observe.

$$\hat{R}_r(s, a) = L(s' \notin F \mid, s) \max_{k \in I} \rho(k). \quad \text{(eq. 10)}$$

The basic concept is to increase the reward for communications when the mission objectives are at risk and the value of the local information is high. The utilization of a reward function p and L by its nomenclature appears similar to belief-dependent rewards; however, it is not. The reward functions are not tied to the current belief but are calculated for each state of the IKD model and assume a linear function between states, as seen with any belief-state MDP. The reward functions can be learned during operation and the policy recalculated; however, the reward function will remain piecewise linear and convex within the hyperplane of belief space and do not change as the belief changes.

Collaboration is a normalized reward $\hat{R}_c(a, s)$ based upon the joint product of the proximity of a quantized state to approaching the heuristic bound where collaboration will diverge and become unbounded Q(•), as with intermittent communication in controls with a Kalman filter's estimation error covariance, and the maximal value of information that can be shared with that particular neighbor $\rho(k_n)$.

$$\hat{R}_c(a, s) = \frac{1}{|N|} \Sigma_{j \in N} S(Q(\lambda_j \mid a, s)) \cdot \max_{k \in I_j} \rho(k \mid a), \quad \text{(eq. 11)}$$

where S(•) is the sigmoid function $1/(1+e^{-k(x-x_0)})$, $Q(\lambda_j|a, s)$ is the probability that the communication action a with neighbor $j \in N$ will approach the proximity of an unbounded heuristic $\lambda \in \Lambda$, Λ is the limits of the upper $\overline{\lambda}$ and lower $\underline{\lambda}$ bound heuristic of a critical probability c that is dependent on the model, and $\max_{k \in I} p(k|a)$ is the best value of information (k) that an agent $j \in N$ could receive from i with the action a based upon on its own local observations $I_j$.

Therefore, as the lack of communications drives the state towards an unbounded heuristic and the value of information to another agent increases, the reward for communication increases drastically. The final reward R(s, a) is sum of the collaboration and relevance rewards with one exception. If the action is not to transmit (a=Ø), the reward is zero for all states.

$$R(s, a) = \begin{cases} \hat{R}_r + \hat{R}_c, & \text{if } a \neq \emptyset \\ 0, & \text{if } a = \emptyset \end{cases} \quad \text{(eq. 12)}$$

This at first appears counter intuitive, because the action to not transmit will be dominated by all other actions which is intentional. If the agent stops transmitting then it always is going to lead to information loss and therefore provides no benefit not to continuously transmit. It is the constraints to preserve resources that will introduce a null action or one that utilizes less resources back into the controller as a viable constraint state to satisfy the soft constraints.

Transition and Observation Models.

As with the rewards model, transitions and observations are divided into relevance and collaboration components. Transitions probabilities from one state s to another state s' based upon an action a are initially assumed to be independent to reduce computational complexity and therefore are the product of the independent transitions of the components $$T(a, s, s') = \prod_{i=1}^{n} \Pi_{\sigma_k \in \Sigma_i} T(a, s_r^k, s_r^{k'}) \cdot \Pi_{j \in N_i} T_n(a, s_c^j, s_c^{j'}), \quad \text{(eq. 13)}$$

where T is the transition matrix, and $s_r$ and $s_c$ are the relevance and collaboration state components respectively of the combinatorial state space. The component transition functions $T(a, s_r, s_r')$ and $T_n(a, s_c, s_c')$ are determined by the knowledge being shared and are discussed in the use case shown in FIG. 1. The observation probabilities are similarly constructed as the transition probabilities with the relevance and collaboration components $$O(a, s, o) = O(a, s_r, o_r) \cdot \prod_{j \in N_i} O_n(a, s_c^j, o_c^j), \qquad \text{(eq. 14)}$$

where O is the observation matrix, and $o_r$ and $o_c$ are the relevance and collaboration components respectively of the combinatorial observation space.

Though the relevance of the information and the collaboration between agents are conditionally dependent in reality, the formulation of the model as a decentralized POMDP reduces the dependence with the focus on local observations allowing to validate the approach before addressing a conditional dependence transition and observation model.

The observation model can be important in restructuring the POMDP to avoid belief-dependent rewards and its associated more complex solution methods. In the construction of an IKD model, an observation model can be designed to provide the ability to map observations to the appropriate belief space for relevance and collaboration. Any mapping from observations in the environment to an observation state is the mapping of a continuous observation space to discrete observations through cluster-based techniques, such as K-medoids or DBScan.

Experimental Model.

Referring back to FIG. 1, the use case for validating the constrained-action POMDP for intelligent knowledge distribution was the monitoring of ground assets during a disaster response to ensure they safely avoid hazards and dangerous situations they might not be aware of from their perspective on the ground. Though a ground vehicle could potentially have accurate location information from GPS, we consider the asset tracking viable, because there are situations were GPS information in a disaster site is either unavailable or degraded due to obstructions or other factors; the actual location of the hazards are not known and the monitoring drones need to maintain relative positioning; and the ground asset needs to update its motion planning to optimize for known hazards as they are estimated by monitoring drones.

The agents are unmanned aerial vehicles performing a continuous predefined search pattern around the disaster site while communicating across a first responders mobile ad-hoc network, as shown in FIG. 1. In this initial study to validate the concept, the agents are only tracking a single ground asset and need to determine what sensor information needs to be shared between them to ensure they maintain situation awareness of the risk. They also provide a relative position warning to the ground asset so that it can update the edge costs of its motion planning algorithm appropriately, D*-Lite.

The IKD model can include a combinatorial problem between the neighboring nodes, the heterogeneous sensor data, the relevance of the information, and the current level of collaboration. Since an agent can only communicate with a single node at a time due to routing protocols with wireless fidelity (Wi-Fi) mesh networking, it needs to determine the risk it believes an asset is under (relevance) and how confident it is in the data it has received so far from other nodes (collaboration) to ascertain the appropriate information to send and to whom to maintain accurate situational awareness, all while not overly consuming the limited resources of bandwidth in the MANET and power available from the UAV battery.

Asset Localization and Kalman Filter.

An unscented Kalman filter (UKF) can be utilized in performing localization of the ground vehicle from multiple drones, where each drone is providing a bearing and distance to the ground vehicle with variances per the capabilities of the sensor packages that are aboard that particular drone. Kalman filters (KF) are a common approach to guidance, navigation, and control of vehicles and robots as a linear quadratic estimator of the state of a system from a series of measurement or observation samples over time. The unscented Kalman filter (UKF) uses a deterministic sampling technique known as an unscented transform around a minimal set of sample points about the mean, which performs well in highly non-linear systems as compared to extended Kalman filters (EKF).

A nonlinear Kalman filter can be employed due to the nonlinearity of the motion model with arcs of motion depending on the angle of the front wheel and the nonlinearity of triangulating the position of the ground vehicle from drones with sensor bearings and distances. The motion model f(x, u) of the ground vehicle is a standard bicycle model with static rear wheel and variable front wheel. The state model x maintains information on the position and orientation of the ground vehicle as the vector $x = [x\ y\ \theta]^T$, where (x, y) is the location of the ground vehicle in the disaster site as measured in meters and is the bearing in radians. The state transition function x is a non-linear motion model f(x, u) with Gaussian white noise N(0, Q) defined as:

$$\bar{x} = x + f(x, u) + N(0, Q) \qquad \text{(eq. 15),}$$

where u is the command input $[v, \alpha]^T$ to the ground vehicle control system and is defined by the linear velocity v and the steering angle $\alpha$ of the ground vehicle. The measurement model z:

$$z = h(x, P) + N(0, R), \qquad \text{(eq. 16)}$$

$$h(x, P) = \begin{bmatrix} \sqrt{(p_x - x)^2 + (p_y - y)^2} \\ \tan^{-1}\left(\frac{y - p_y}{x - p_x}\right) - \theta \end{bmatrix}, \qquad \text{(eq. 17)}$$

involves the bearing and distance to the ground vehicle x=[x, y] from the current observation location of drone $[p_x, p_y]$, in which the bearing and range measurement noise:

$$R = \begin{bmatrix} \sigma_{range}^2 & 0 \\ 0 & \sigma_{bearing}^2 \end{bmatrix}, \qquad \text{(eq. 18)}$$

of sight to the target. In cases where a drone does not have a line of sight of the ground asset nor any observation communications from another drone, this is a missing measurement. For the UKF, the unscented transform uses a particle-based technique, which requires the ability to calculate the mean of the particles. Calculating the mean of the positions is a simple mathematical average, whereas calculating the mean of the bearing is $$\overline{\theta} = \operatorname{atan2}\left(\frac{\sum_{i=1}^{n} \sin\theta_i}{n}, \frac{\sum_{i=1}^{n} \cos\theta_i}{n}\right). \qquad (\text{eq. 19})$$

There are two occurrences that need to be addressed in the application of Kalman Filters because of intermittent communications and limited line of sight: missing measurements and missing observations. In missing measurements, there is no information at a discrete time step to update the state estimate and the predicted measurement is propagated forward as an observation. For missing observations, there are observations at a given time step but not of all the state information. In the case of geolocation through triangulation, a bearing and distance measurement is not available to accurately pinpoint the robot, but there are enough observations to get a less accurate measurement. With UKF, the unscented transform is performed as usual, because the model can be constructed "on-the-fly" to replicate the variance that would be seen with the lack of observation for a fully accurate triangulation by adjusting the measurement noise, R.

If the probability of arrival $\lambda$ of an observation in a Bernoulli process is less than a critical probability $\lambda \leq \lambda_c$ for a Kalman Filter, then the expectation of the estimation error covariance is unbounded. The lower bound of the critical probability $\underline{\lambda}_c$ has a closed form solution but the upper bound $\overline{\lambda}$ requires solving a linear matrix inequality (LMI). Therefore, a simplified simulation can be employed involving fixed observation points to experimentally approximate upper $\hat{\lambda}$ and lower $\underline{\lambda}$ heuristics for $\Lambda$ of the IKD reward function Q as applied to Kalman filters for use in the full simulation.

Model Formulation.

Due to size, weight, and, power (SWAP) restrictions of the unmanned aerial vehicles, the devices are assumed to have heterogeneous sensors with overlapping sensor support. Each unmanned aerial vehicle can be assigned to carry two sensors on their platform from a total possibility of three sensors: radiofrequency geolocation sensor, optical tracking sensor, and a laser range finder. Therefore, each device, or "node", has the option of sending the result of a sensor to any one of the nodes. This creates a combinatorial action space consisting of the sensors data on-board and the number of neighbors N, including the action of not transmitting any information, resulting in $2^{|N|}+1$ actions. The combinatorial explosion caused by scaling the number of agents in the system can be combatted with the use of collaboration graphs to factor the action space between agents by clustering capabilities, location, etc.

As an example, an unmanned aerial vehicle can be connected to two other aerial vehicles (e.g., Node A and Node B) with RF geolocation and optical tracking capabilities. As such, five total actions exist during any time epoch: (1) do not communicate ("silence" or null); (2) send RF geolocation results to Node A; (3) send optical tracking results to Node A; (4) Send RF geolocation results to Node B; and (5) send optical tracking results to Node B The state information is assumed to be a combinatorial set of the relevance of the data, the risk to the ground asset in this case, and the state of collaboration, the expected value of information based upon previous communications, and the quality of the data. The rewards are also combinatorial as formulated in IKD with the information theoretic metric $\rho$ based upon the information matrix of the sensor variances $\rho = 1/k_a$. This leads to an updated relevance of:

$$R_r(a,s) = L(s' \notin F \mid a) \cdot \frac{1}{k_a}, \qquad (\text{eq. 20})$$

where $k_a = \min_{j \in N}(\sigma_i \sigma_j)$, $\sigma_i$ is the variance of the local sensor information being transmitted, and $a_i$ is the variance of a collaborative agent $j \neq i \in N$. This also leads to an updated collaboration reward of:

$$\hat{R}_c(s,a) = \frac{1}{|N|} \Sigma_{j \in N} \; S(Q(\lambda_j \mid a, s)) \cdot \frac{1}{k_a}, \qquad (\text{eq. 21})$$

where the sigmoid function $S(\bullet)$ has a center point $x_0 = \frac{1}{2}(\overline{\lambda} + \underline{\lambda})$ and k is set to create a switching function beyond the heuristic bounds of $\Lambda$. The function Q adjusts j based upon the current state s of communication collaboration and the value of information $k_a$ in the action a to improve the covariance of the Kalman filter.

The transition probabilities for relevance are driven by the relationship between the monitoring UAVs and the ground asset. The ground asset is assumed to be reachable by the UAVs through the MANET or a multi-hop network so that it can be influenced in finding a more conservative route by updating the edge costs between waypoints around the relative position of the hazard. The timeliness and usefulness of the data being transmitted and received was utilized to calculate the collaboration transition probabilities via experimentation.

Observation probabilities are defined through subject matter expertise and experimental learning. The Kalman filter and a sufficient statistic of observation histories, a Bayesian estimator, were processed through a belief function to create the relevance and collaboration mapping to the observation space $o \in O$. The observation states include a discrete categorization of local observations using a K-means clustering algorithm learned unsupervised from numerous Monte Carlo simulations. In particular, the mapping of observations $v_r$ is performed solely by cluster classification of the state estimation and its covariance, driven by sensor inaccuracies $\sigma_k$, of the ground asset's proximity to hazards to observation relevance states $\sigma_r$.

Whereas, the observation mapping $v_c$ for collaboration is based on multiple observations: (1) a Bayes estimation of the current arrival probability $\hat{\lambda}_{i,j}$ of messages $\sigma: j \rightarrow i$ or $\sigma: i \rightarrow j$ used to ascertain proximity to heuristic bounds; (2) the usefulness of information $\sigma_k$ recently received from or sent to another agent j according to $K_a$; and, 3) the lagged autocovariance $\operatorname{cov}(P[m], P[m+1])$ of the Kalman filter covariances P to evaluate the impact of information exchange over time in maintaining mission objectives involved in asset tracking. A collaboration mapping $v_c$ is the cluster classification of $\hat{\lambda}$, $\sigma_k$, and $\operatorname{cov}(\bullet)$ to the observation space $o_c$. The relevance $o_r$ or and collaboration $o_c$ observations from the mappings v are indexed to the observation o in the combinatorial set, which then drives the edge transitions of the finite state controller policy.

Constraints on Communication and Other Actions.

The constraints being analyzed by CA-POMDP are the utilization of bandwidth (bytes per second) and power (Watt per second) over one second, which is a sampling length of 10 epochs as the UAV makes a collaboration decision every 100 ms. The constraints are considered soft constraints because there is often more available bandwidth in the network than is being allocated to multi-agent collaboration. Also, network protocols like ZeroMQ permit queueing techniques to account for myopic link saturation. The power utilization is considered an average power consumption needed for the communication system to use to ensure the UAV can maintain the required flight time needed to maintain situational awareness of the disaster site.

Resource utilization by the UAVs is dependent on the type of information they are sending. It is assumed that sending optical data requires more data and therefore higher power requirements to achieve the SNR needed for higher bandwidth physical layer protocols, e.g. 64QAM. The data for laser range finding then RF geolocation are assumed to take sequentially less data and power than optical data.

Results of Experiments and Analysis Thereof.

The benefits of applying Constrained-Action POMDPs to Intelligent Knowledge Distribution were investigated by (1) comparing the final optimal and constrained controller for variable levels of probabilistic constraint satisfaction, and (2) a Monte Carlo simulation that compared the accuracy and resource utilization of IKD to a greedy and naive communication model.

Figure 7A:
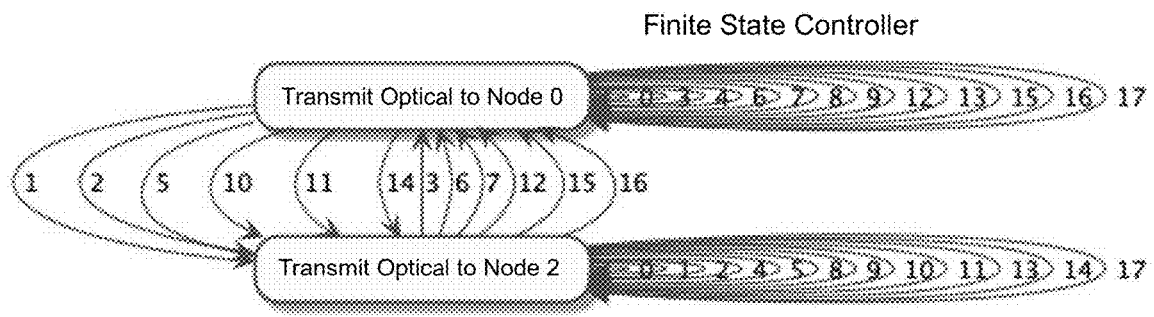
FIG. 7A is an example of an unconstrained controller of an unmanned aerial vehicle performing communications in accordance with various embodiments of the present disclosure.
Figure 7B:
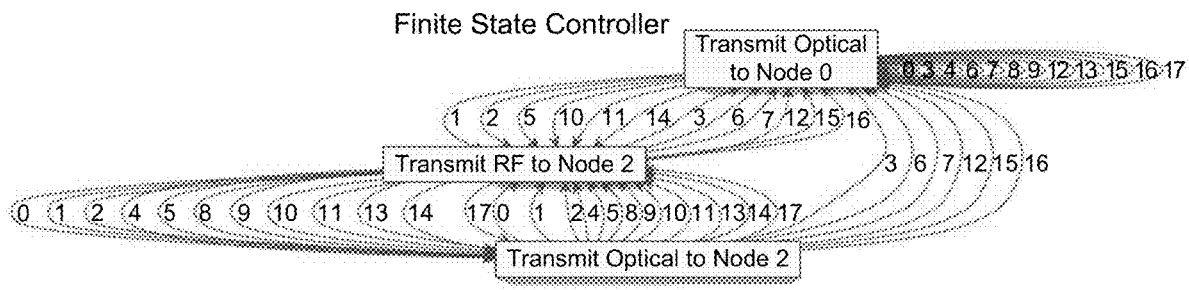
FIG. 7B is an example of a constrained controller of an unmanned aerial vehicle performing communications intelligently in accordance with various embodiments of the present disclosure.
Figure 8:
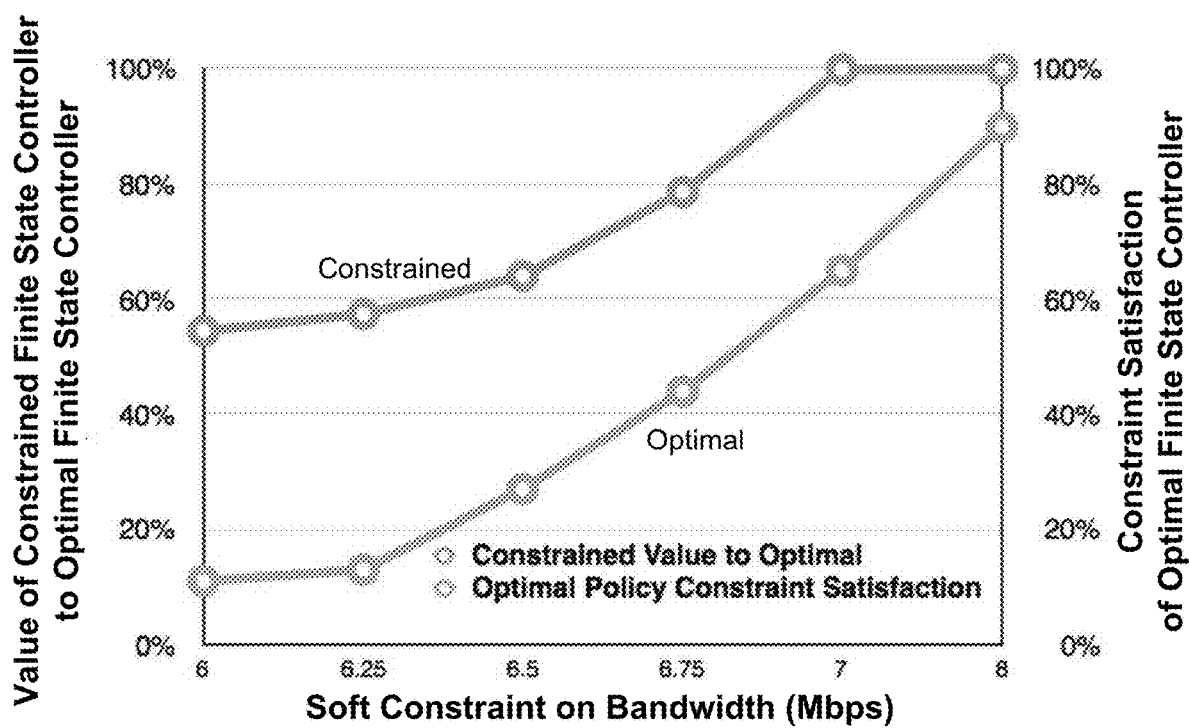
FIG. 8 is a graph illustrating an impact to a value function and probabilistic constraint satisfaction when satisfying soft limits for bandwidth in accordance with various embodiments of the present disclosure.

Greedy communications assume a constant communication of the best information observed at all times alternating the destination between each time epoch between its collaborating neighbors. Naive communications applies a probability of communicating depending on the relevance of the information, the estimated proximity to a hazard. The tradeoff of constraint satisfaction and optimal value is shown in FIG. 8, along with an analysis of how the controller is impacted by constraint states in FIGS. 7A and 7B.

Constraint Satisfaction during Simulation.

The constraint satisfaction of the IKD controller was analyzed in a Monte Carlo simulation with multiple random start and goal location for the ground vehicle, random placement of hazards in the environment, and a random initial belief state of the controller for each of the three scenarios of greedy, naive, and intelligent communications. The IKD allowed the CA-POMDP Model to recalculate a new constrained policy during the execution of a simulation when the variation of information exceeded a threshold to ensure continued compliance to constraints. The histograms for the resource utilization of bandwidth and power were compared to confirm the improvement of IKD on meeting soft constraints, shown in FIG. 9A and FIG. 9B, respectively.

Figure 9A:
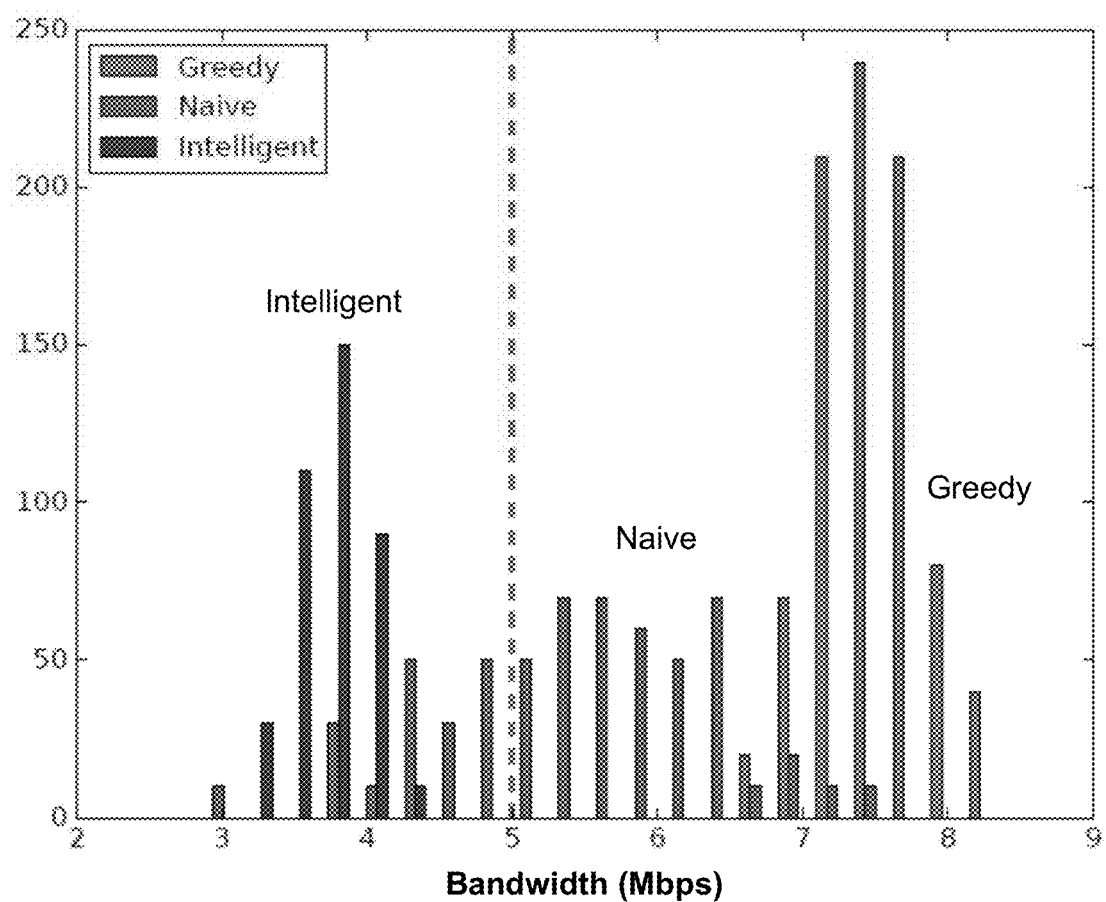
FIGS. 9A and 9B are graphs illustrating a comparison of constrain satisfaction from Monte Carlo simulation scenarios involving unmanned aerial vehicles in accordance with various embodiments of the present disclosure.
Figure 9B:
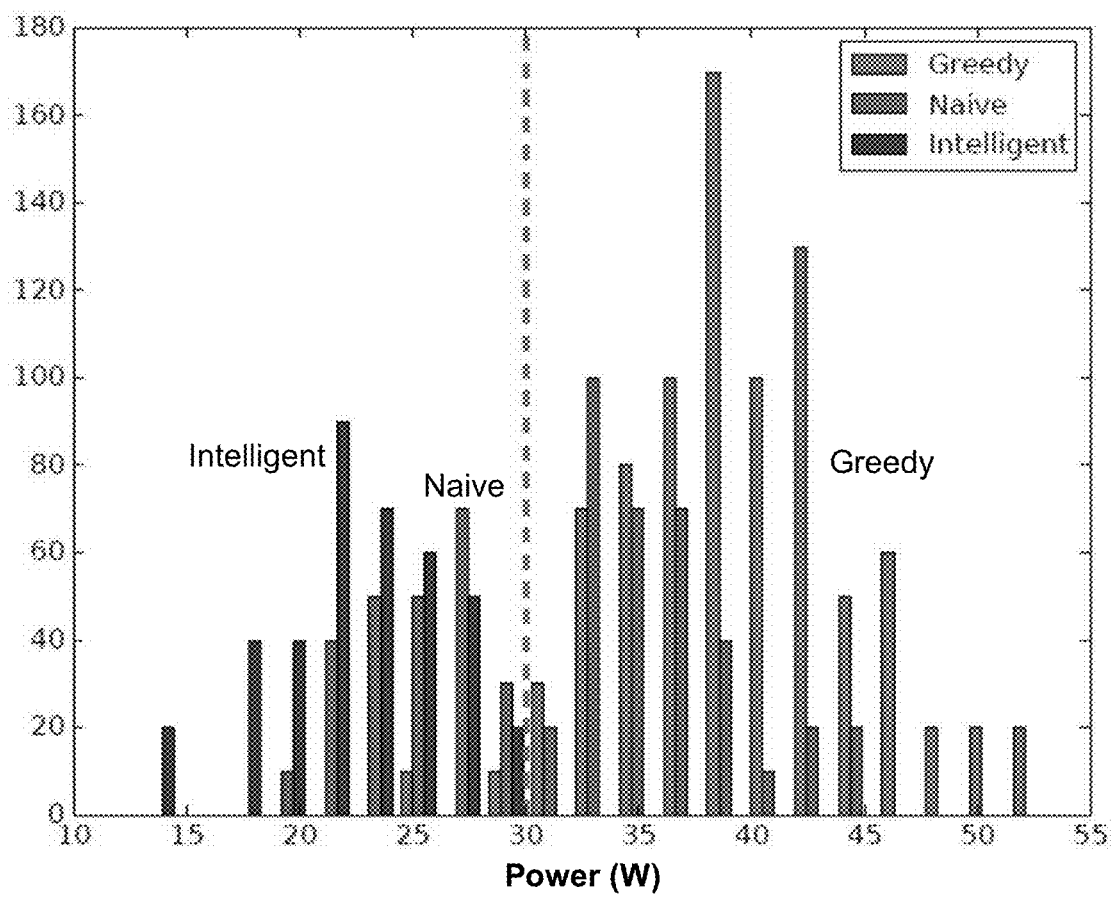

As can be seen in the histograms of FIGS. 9A and 9B, the IKD model was able to determine a finite state controller that complied with probabilistic constraints against the soft limits for both power and bandwidth while naive and greedy did not. As expected, the naive communication model with its probabilistic approach to making communication decisions on data relevance alone utilized less resources than the purely greedy communication model that always transmits. Despite the improvement of the naive approach, the IKD approach was compliant to soft constraints while still maintaining the covariance errors of the UKF state estimation.

Figure 10:
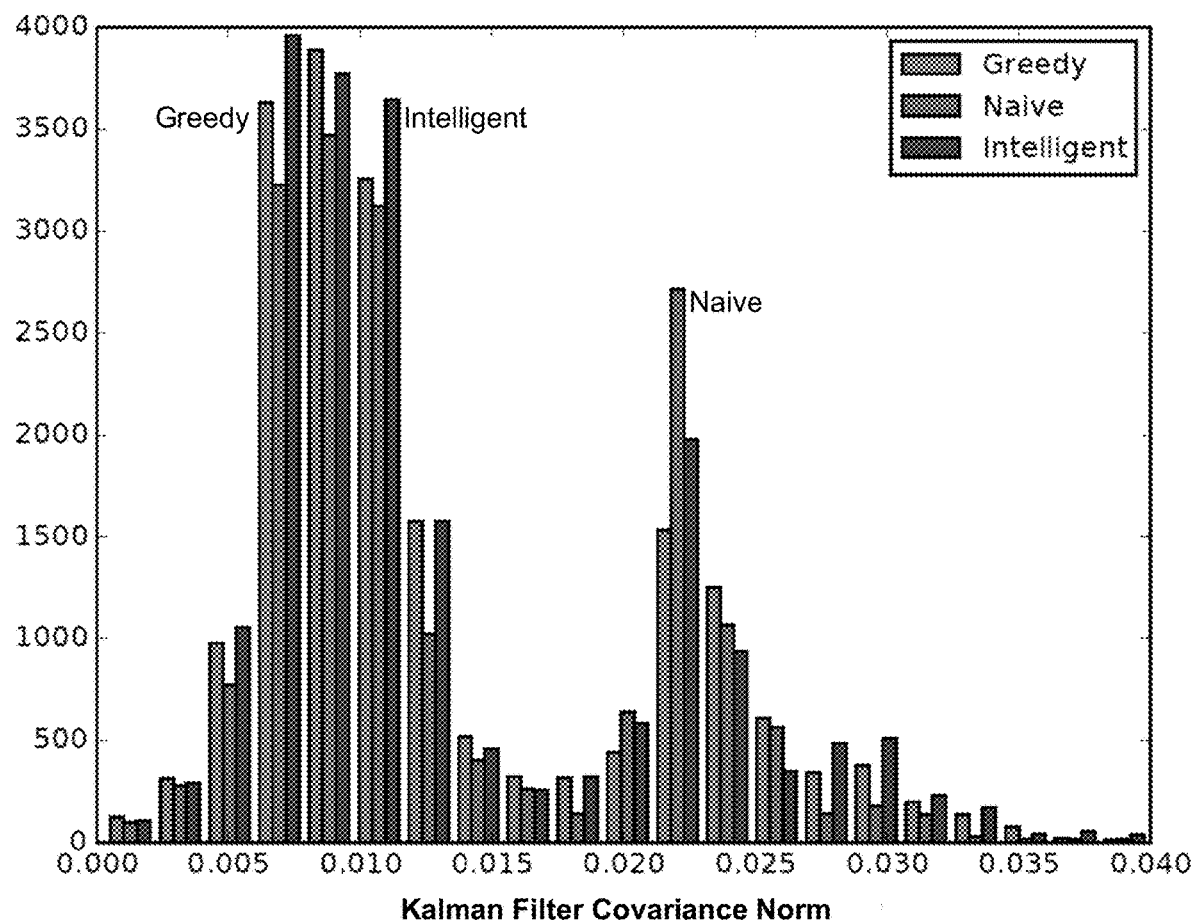
FIG. 10 is a histogram of a norm of an unscented Kalman filter covariance matrix showing accurate estimates generated for a ground vehicle in accordance with various embodiments of the present disclosure.

FIG. 10 shows the norm of the UKF covariance between the three communication models, where all models maintain reliable state estimates even with the missing measurements and observations. Two distributions in the graph are indicative of the times when the filter has full observational data and when the filters have missing observations and measurements. Table I below shows the statistical summaries of the Monte Carlo simulation of all the histograms.

TABLE I

Comparison of Bandwidth and Power Constraint Satisfaction between Greedy, Naive, and Intelligent Communications with the Resulting Mean Kalman Filter Covariance

| Model | BW | Power | VAR |
|---|---|---|---|
| Greedy | 0% | 2% | 0.0132 |
| Naive | 32% | 40% | 0.0135 |
| Intelligent | 97% | 97% | 0.0133 |

The statistical mean of the bandwidth and power utilization is shown in the first two columns that validates the histograms of FIGS. 9A and 9B, where the statistics are the actual cumulative distribution (or percentage) below the soft constraints shown as dotted red lines in the figures. The covariances of FIG. 10 are shown in the last column and it is of interest to note that IKD maintained better covariance than naive.

During the construction and analysis of the system that if the optimal controller meets probabilistic constraint satisfaction less than 15% of the time, then there was an unacceptable level of probability that the resulting constrained controller would not meet mission objectives. The Monte Carlo simulations indicate that the incorporation of Intelligent Knowledge Distribution (IKD) that determines what information is needed to whom and when under soft constraints was successful. The approach provides an agnostic "plug-and-play" framework for IKD by constraining the actions of a POMDP to only transmit information to a collaborative agent when the value of that information warrants the communication. Constrained-Action POMDPs provide a level of guarantee of probabilistic constraint satisfaction to a desired operational behavior while still allowing short-term bursts of critical information. It also validates the concept of using Markov chain Monte Carlo analysis to evaluate an infinite-horizon policy represented as a finite state controller for its probability of satisfying soft constraints and a combinatorial discrete optimization for achieving desired constraint behavior of a policy while minimizing impact on the controller's value.

During the simulation, the communication links and their usage was not accurately known a priori until the system was in a realistically simulated dynamic environment and the resource utilization was learned online. Also, the probabilities of edge transitions of the controller were initially assumed to be a uniform distribution during constraint evaluation and the actual transitions were learned online and the controller adapted to realistic usage of the policy.

As the number of agents grow to respond to operational needs, communication between agents grows at $\frac{1}{2}|A|(|A|-1)$. To reduce the number of communication channels and improve the feasibility of solving for the IKD communication model in larger multi-agent systems, learning coordination graphs seen in Network Distributed POMDPs (ND-POMDP) implementations will be addressed in future work, which could be different for each taxonomy of information being tracked by the agents. For IKD in real-time operational scenarios, the agents available to collaborate and coordinate may not be known until they are actively in the field, therefore learning heterogeneous interactions and constructing a coordination graph online is a necessary expansion.

Finally, the above approach is actively being expanded into a fully collaborative multi-agent target tracking simulation to evaluate its effectiveness in a Concurrent Constrained Decentralized POMDP, where the IKD CA-POMDP is one POMDP working concurrently with tasking, motion planning, and target modeling MDPs.

Figure 11:
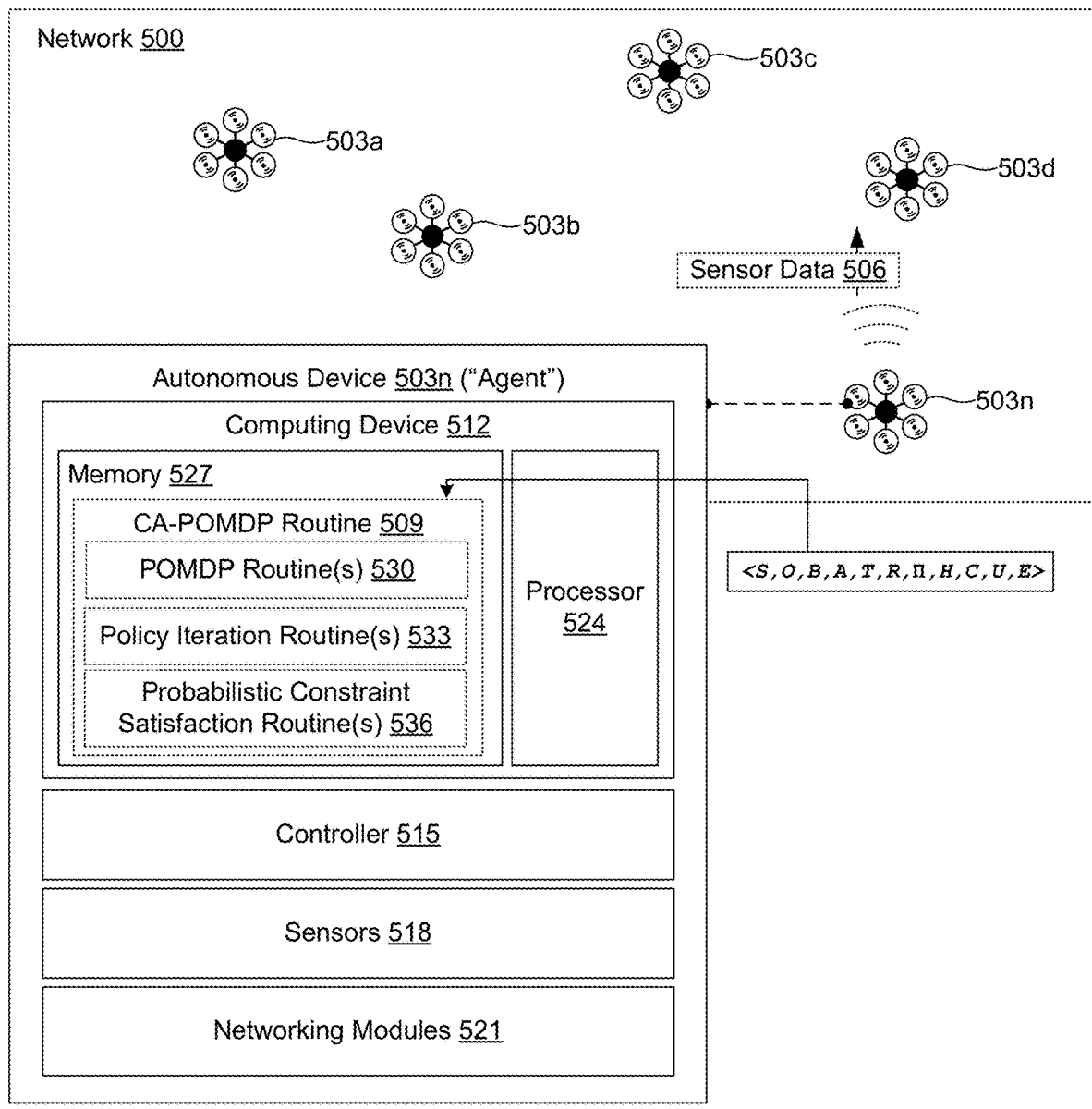
FIG. 11 is an example network having a plurality of autonomous devices according to various embodiments.

Turning now to FIG. 11, an example of a network 500 having a plurality of autonomous devices 503a . . . 503n (or "agents") is shown according to various embodiments. As noted above, the embodiments described herein can include implementing a CA-POMDP to determine what information should be sent to whom and when given various constraints, such as limited computing and networking resources available to a device or network. For instance, a respective one of the autonomous devices 503n, can determine whether to communicate sensor data 506 to one or more of the other autonomous devices 503a . . . 503d through execution of a CA-POMDP Routine 509.

An autonomous device 503 can include, for example, at least one computing device 512, a controller 515, one or more sensors 518, one or more networking modules 521, as well as other components not described herein. The at least one computing device 512 can include, for example, a processor 524, memory 527, a data bus, as well as other components. In alternative embodiments, the computing device 512 can include a microcontroller, an application specific integrated circuit (ASIC), or other similar hardware.

Stored in memory can include the CA-POMDP Routine 509, which can include the POMDP routines 530, the policy iteration routine(s) 533, the probabilistic constraint satisfaction routines 536, as well as other routines, as can be appreciated. Through execution of the CA-POMDP routine 530, the autonomous device 503 can determine what information should be sent to whom and when given various constraints, such as limited access to memory 527, the processor 524, and networking resources, such as the networking module 521 (or bandwidth of the network 500), available to the autonomous device 503n. As can be appreciated, a policy 540 can be generated that is unique to the particular autonomous device 503 and/or computing device 512. The policy 540 can dictate actions to be performed by the autonomous device 503, such as collecting sensor data 506 using the at least one sensor 518 or communicating the sensor data 506 to another computing device (e.g., another autonomous device 503).

While FIG. 11 illustrates unmanned aerial vehicles, in alternative embodiments, the computing device 512 can include one implemented in an Internet of Things (IoT) devices. IoT relates to implementing Internet connectivity beyond conventional into any range of traditionally physical devices and everyday objects, such as doorbells, security cameras, thermostats, and other household or commercial devices. Accordingly, in some embodiments, the computing device 512 can be employed to determine whether an IoT device should communicate or otherwise interact with another devices, for instance, over a network, such as a wide area network (e.g., the Internet), local area network, near field communication, or similar medium.

Figure 12:
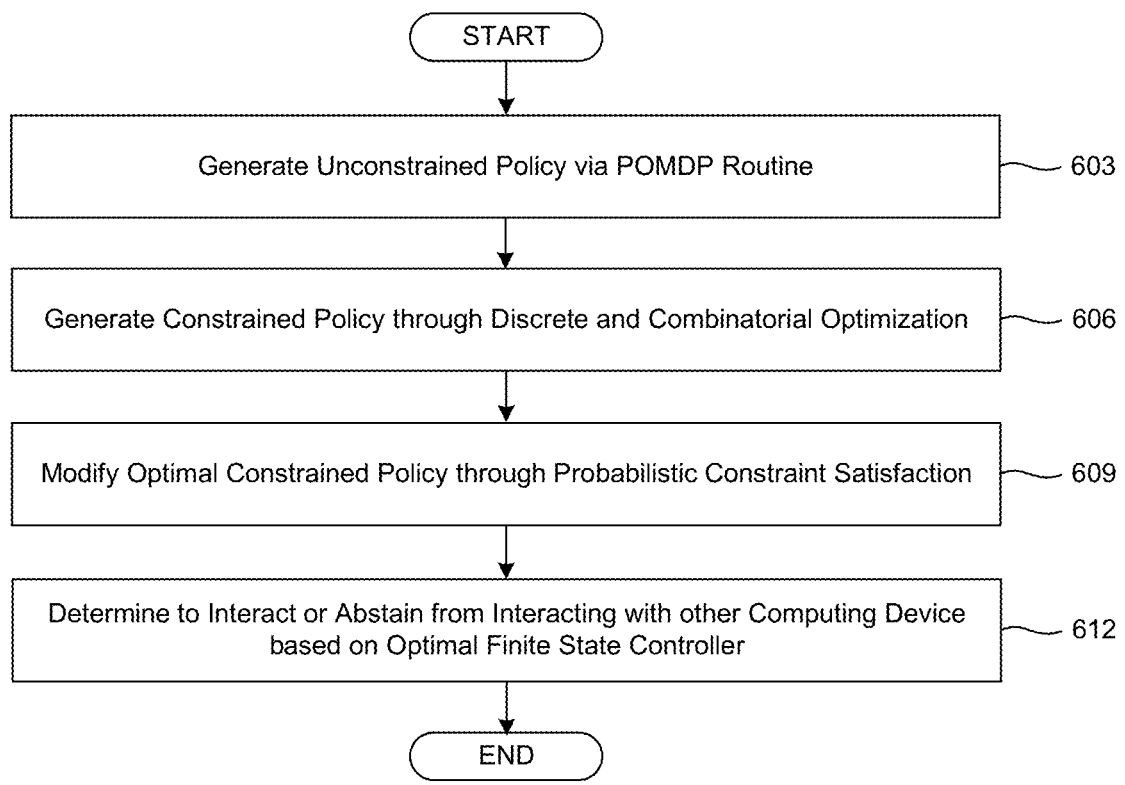
FIG. 12 is a flowchart that provides one example of the operation of a portion of the CA-POMDP routine.

Moving on to FIG. 12, a flowchart is shown that provides one example of the operation of a portion of the CA-POMDP routine 509. The flowchart of FIG. 12 can be viewed as depicting an example of elements of a method implemented by an autonomous device 503 or an agent application executing in the autonomous device 503 or the computing device 512 according to one or more examples. The separation or segmentation of functionality as discussed herein is presented for illustrative purposes only.

Beginning with step 603, the autonomous device 503 can generate an unconstrained policy through execution of a partially observable Markov decision process (POMDP) routine In some embodiments, the autonomous device 503 can generate an optimal constrained policy by invoking a policy iteration routine that applies at least one transformation to the finite state controller generated through execution of the POMDP routine, the optimal constrained policy generated comprising an epsilon-optimal finite state controller having a threshold probability of operating within at least one operational constraint within a period of time. The at least one operational constraint can include at least one of: bandwidth, battery power, or a computing resource.

In step 606, the autonomous device 503 can apply a discrete and combinatorial optimization routine to bring or modify the finite state controller within a probabilistic constraint satisfaction threshold. In step 612, the autonomous device 503 can determine to perform (or abstain from performing) an action (e.g., interacting with another autonomous device 503) based at least in part on a current state of the at least one computing device 512 and the finite state controller determined in step 606 and 609. The action can include at least one of: collecting sensor data using the at least one sensor or communicating the sensor data to another computing device. Thereafter, the process can proceed to completion in a continuous loop taking observations and determining the next appropriate action per the finite state controller.

Figure 13:
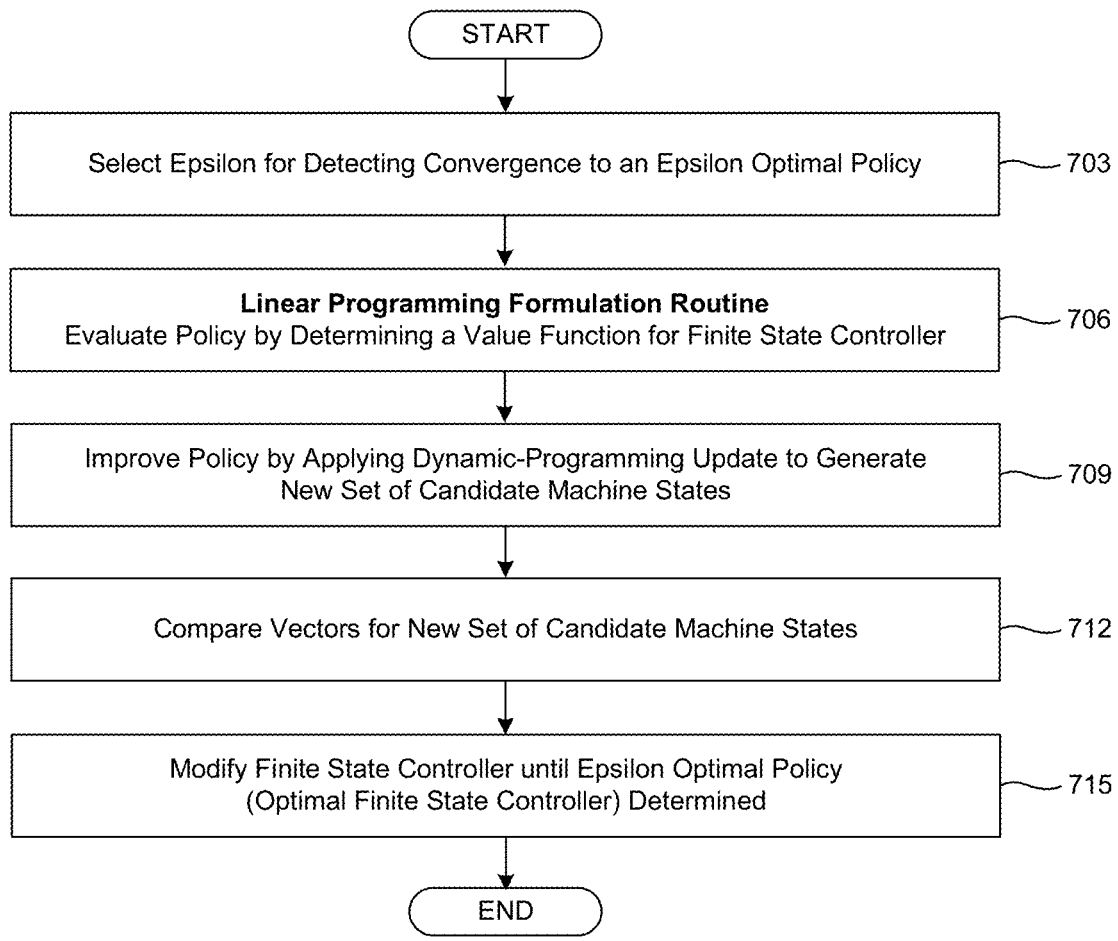
FIG. 13 is a flowchart that provides one example of the operation of a portion of the CA-POMDP routine and/or the policy iteration routine.

Moving on to FIG. 13, a flowchart is shown that provides one example of the operation of a portion of the CA-POMDP routine 509 and/or the policy iteration routine 509. The flowchart of FIG. 13 can be viewed as depicting an example of elements of a method implemented by an autonomous device 503 or an agent application executing in the autonomous device 503 or the computing device 512 according to one or more examples. The separation or segmentation of functionality as discussed herein is presented for illustrative purposes only.

The policy iteration routine comprises applying the at least one transformation until a predetermined epsilon convergence is observed by selecting an epsilon value for detecting convergence of the unconstrained policy to the optimal constrained policy (step 703); evaluating the unconstrained policy by determining solving a Linear Programming formulation for the value function of the unconstrained policy (step 706); improving the unconstrained policy by applying a dynamic-programming update that generates a new set of candidate machine states for the unconstrained policy (step 709); comparing a first plurality of vectors of the new set of candidate machine states to a second plurality of vectors of the unconstrained policy (step 712); and modifying a finite state controller of the unconstrained policy until the epsilon-optimal finite state controller is determined (step 715). Thereafter, the process can proceed to completion.

Figure 14:
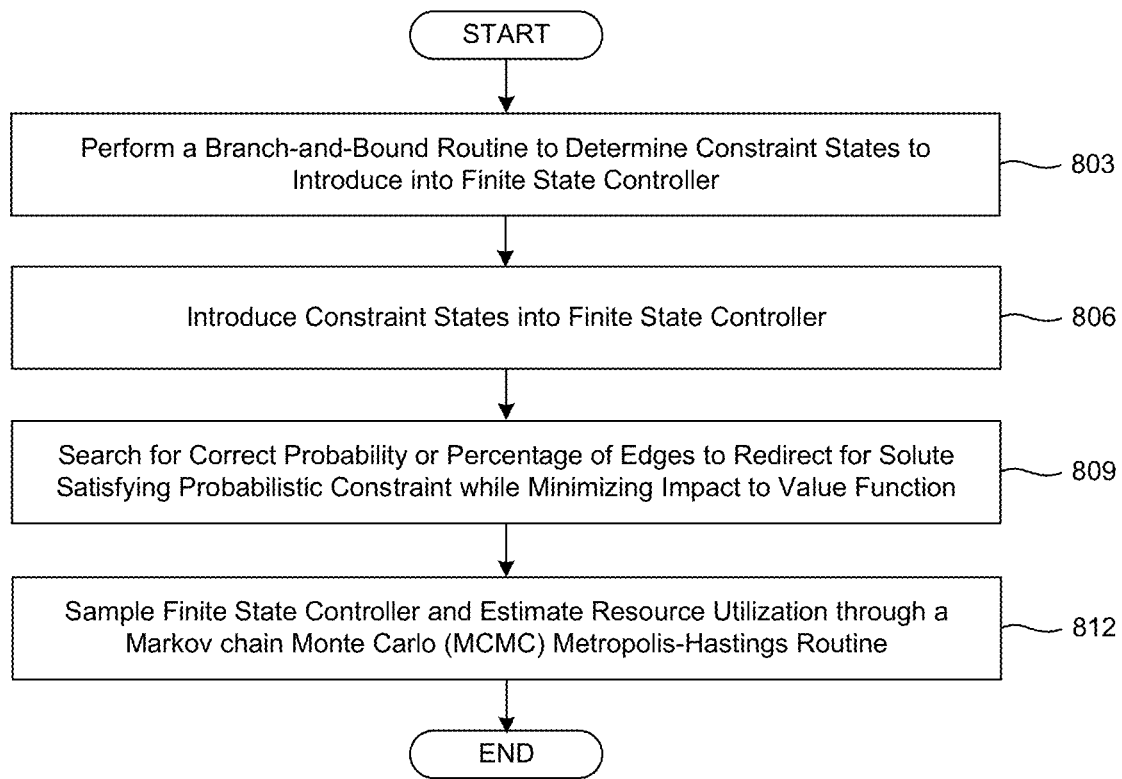
FIG. 14 is a flowchart that provides one example of the operation of a portion of the CA-POMDP routine and/or the probabilistic constraint satisfaction routine.

Referring next to FIG. 14, a flowchart is shown that provides one example of the operation of a portion of the CA-POMDP routine 509 and/or the probabilistic constraint satisfaction routine 509. The flowchart of FIG. 14 can be viewed as depicting an example of elements of a method implemented by an autonomous device 503 or an agent application executing in the autonomous device 503 or the computing device 512 according to one or more examples. The separation or segmentation of functionality as discussed herein is presented for illustrative purposes only.

The probabilistic constraint satisfaction routine can include modifying the optimal finite state controller to probabilistically satisfy at least one soft constraint by performing a branch-and-bound (BnB) routine to determine a set of constraint states to introduce into the optimal finite state controller (step 803); introducing a plurality of constraint states into the optimal finite state controller (step 806); and searching for a correct probability or a percentage of edges to redirect for a solution that satisfies at least one probabilistic constraint while minimizing impact to a value of the optimal finite state controller, the value determined using a value function (step 809). IN some embodiments, the method can further include performing a sampling of the finite state controller and estimate resource utilization through a Markov chain Monte Carlo (MCMC) Metropolis-Hastings routine based on the sampling to ascertain the probability of constraint satisfaction (step 812).

Stored in the memory 527 are both data and several components that are executable by the processor. Also stored in the memory 527 can be a data store, data base, and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing.

Although the various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Clause 1. A computer-implemented method for implementing a constrained-action partially-observable Markov decision process (CA-POMDP), comprising: generating, by at least one computing device, an unconstrained policy through execution of a partially observable Markov decision process (POMDP) routine; generating, by the at least one computing device, an optimal constrained policy by invoking a policy iteration routine that applies at least one transformation to the finite state controller, the optimal constrained policy generated comprising an optimal finite state controller having a threshold probability of operating within at least one operational constraint within a period of time; applying, by the at least one computing device, a probabilistic constraint satisfaction routine to bring the optimal finite state controller within a probabilistic constraint satisfaction threshold; and determining, by the at least one computing device, to perform an action based at least in part on a current state of the at least one computing device and the optimal finite state controller.

Clause 2. The computer-implemented method of clause 1, wherein the at least one operational constraint comprises at least one of: bandwidth, battery power, or a computing resource.

Clause 3. The computer-implemented method of any of clauses 1-2, wherein the policy iteration routine comprises applying the at least one transformation until a predetermined epsilon convergence is observed by: selecting an epsilon value for detecting convergence of the unconstrained policy to the optimal constrained policy; evaluating the unconstrained policy by solving a linear programming formulation for the value function for the unconstrained policy; improving the unconstrained policy by applying a dynamic-programming update that generates a new set of candidate machine states for the unconstrained policy; comparing a first plurality of vectors of the new set of candidate machine states to a second plurality of vectors of the unconstrained policy; and modifying a finite state controller of the unconstrained policy until the optimal finite state controller is determined.

Clause 4. The computer-implemented method of any of clauses 1-3, wherein the probabilistic constraint satisfaction routine comprises modifying the optimal finite state controller to probabilistically satisfy at least one soft constraint by: performing a branch-and-bound (BnB) routine to determine a set of constraint states to introduce into the optimal finite state controller; introducing a plurality of constraint states into the optimal finite state controller; and searching for a correct probability or a percentage of edges to redirect for a solution that satisfies at least one probabilistic constraint while minimizing impact to a value of the optimal finite state controller, the value determined using a value function.

Clause 5. The computer-implemented method of any of clauses 1-4, further comprising performing a sampling of the finite state controller and estimate resource utilization through a Markov chain Monte Carlo (MCMC) Metropolis-Hastings routine based on the sampling and ascertain the probability of constraint satisfaction.

Clause 6. The computer-implemented method of any of clauses 1-5, wherein the at least one computing device is a component of the autonomous device.

Clause 7. The computer-implemented method of any of clauses 1-6, wherein the autonomous device further comprises at least one sensor and a network communication module.

Clause 8. The computer-implemented method of any of clauses 1-7, wherein the action comprises at least one of: collecting sensor data using the at least one sensor or communicating the sensor data to another computing device.

Clause 9. The computer-implemented method of any of clauses 1-8, wherein the autonomous device is a first one a plurality of autonomous devices in the system, the another computing device comprising a second one of the plurality of autonomous devices.

Clause 10. The computer-implemented method of any of clauses 1-9, wherein at least a portion of the autonomous devices comprise an unmanned aerial vehicle or an Internet of Things (IoT) device.

Clause 11. A system for implementing a constrained-action partially-observable Markov decision process (CA-POMDP), comprising: at least one computing device; and program instructions executable in the at least one computing device that, when executed, direct the at least one computing device to: generate an unconstrained policy through execution of a partially observable Markov decision process (POMDP) routine; generate an optimal constrained policy by a discrete and combinatorial optimization routine that applies at least one transformation to the finite state controller, the optimal constrained policy generated comprising an optimal finite state controller having a threshold probability of operating within at least one operational constraint within a period of time; apply a probabilistic constraint satisfaction routine to bring the optimal finite state controller within a probabilistic constraint satisfaction threshold; and determine to perform an action based at least in part on a current state of the at least one computing device and the optimal finite state controller.

Clause 12. The system of clause 11, wherein the at least one operational constraint comprises at least one of: bandwidth, battery power, or a computing resource.

Clause 13. The system of any of clauses 11-12, wherein the policy iteration routine comprises applying the at least one transformation until a predetermined epsilon convergence is observed by: selecting an epsilon value for detecting convergence of the unconstrained policy to the optimal constrained policy; evaluating the unconstrained policy by solving a Linear Programming formulation for the value function of the unconstrained policy; improving the unconstrained policy by applying a dynamic-programming update that generates a new set of candidate machine states for the unconstrained policy; comparing a first plurality of vectors of the new set of candidate machine states to a second plurality of vectors of the unconstrained policy; and modifying a finite state controller of the unconstrained policy until the optimal finite state controller is determined.

Clause 14. The system of any of clauses 11-13, wherein the probabilistic constraint satisfaction routine comprises modifying the optimal finite state controller to probabilistically satisfy at least one soft constraint by: performing a branch-and-bound (BnB) routine to determine a set of constraint states to introduce into the optimal finite state controller; introducing a plurality of constraint states into the optimal finite state controller; and search for a correct probability or a percentage of edges to redirect for a solution that satisfies at least one probabilistic constraint while minimizing impact to a value of the optimal finite state controller, the value determined using a value function.

Clause 15. The system of any of clauses 11-14, wherein the at least one computing device is further directed to perform a sampling of the finite state controller and estimate resource utilization through a Markov chain Monte Carlo (MCMC) Metropolis-Hastings routine based on the sampling.

Clause 16. The system of any of clauses 11-15, further comprising an autonomous device, the autonomous device comprising at least one microcontroller configured to oversee operation of the autonomous device, the at least one computing device being a component of the autonomous device.

Clause 17. The system of any of clauses 11-16, wherein the autonomous device further comprises at least one sensor and a network communication module.

Clause 18. The system of any of clauses 11-17, wherein the action comprises at least one of: collecting sensor data using the at least one sensor; communicating the sensor data to another computing device; or moving from a first location to a second location.

Clause 19. The system of any of clauses 11-18, wherein the autonomous device is a first one a plurality of autonomous devices in the system, the another computing device comprising a second one of the plurality of autonomous devices.

Clause 20. The system of any of clauses 11-19, wherein at least a portion of the autonomous devices comprise an unmanned aerial vehicle or an Internet of Things (IoT) device.

Therefore, the following is claimed:

1. A computer-implemented method for implementing a constrained-action partially-observable Markov decision process (CA-POMDP), comprising:
   generating, by at least one computing device, an unconstrained policy through execution of a partially observable Markov decision process (POMDP) routine;
   generating, by the at least one computing device, an optimal constrained policy by invoking a policy iteration routine that applies at least one transformation to a finite state controller, the optimal constrained policy generated comprising an optimal finite state controller having a threshold probability of operating within at least one operational constraint within a period of time;
   applying, by the at least one computing device, a probabilistic constraint satisfaction routine to bring the optimal finite state controller within a probabilistic constraint satisfaction threshold; and
   determining, by the at least one computing device, to perform an action based at least in part on a current state of the at least one computing device and the optimal finite state controller.

2. The computer-implemented method of claim 1, wherein the at least one operational constraint comprises at least one of: bandwidth, battery power, or a computing resource.

3. The computer-implemented method of claim 1, wherein the policy iteration routine comprises applying the at least one transformation until a predetermined epsilon convergence is observed by:
   selecting an epsilon value for detecting convergence of the unconstrained policy to the optimal constrained policy;
   evaluating the unconstrained policy by solving a linear programming formulation for the epsilon value for the unconstrained policy;
   improving the unconstrained policy by applying a dynamic-programming update that generates a new set of candidate machine states for the unconstrained policy;
   comparing a first plurality of vectors of the new set of candidate machine states to a second plurality of vectors of the unconstrained policy; and
   modifying a finite state controller of the unconstrained policy until the optimal finite state controller is determined.

4. The computer-implemented method of claim 1, wherein the probabilistic constraint satisfaction routine comprises modifying the optimal finite state controller to probabilistically satisfy at least one soft constraint by:
   performing a branch-and-bound (BnB) routine to determine a set of constraint states to introduce into the optimal finite state controller;
   introducing a plurality of constraint states into the optimal finite state controller; and
   searching for a correct probability or a percentage of edges to redirect for a solution that satisfies at least one probabilistic constraint while minimizing impact to a value of the optimal finite state controller, the value determined using a value function.

5. The computer-implemented method of claim 4, further comprising performing a sampling of the finite state controller and estimate resource utilization through a Markov chain Monte Carlo (MCMC) Metropolis-Hastings routine based on the sampling and ascertain the probability of constraint satisfaction.

6. The computer-implemented method of claim 1, wherein the at least one computing device is a component of an autonomous device.

7. The computer-implemented method of claim 6, wherein the autonomous device further comprises at least one sensor and a network communication module.

8. The computer-implemented method of claim 7, wherein the action comprises at least one of: collecting sensor data using the at least one sensor or communicating the sensor data to another computing device.

9. The computer-implemented method of claim 8, wherein the autonomous device is a first one a plurality of autonomous devices in a system, the another computing device comprising a second one of the plurality of autonomous devices.

10. The computer-implemented method of claim 9, wherein at least a portion of the plurality of autonomous devices comprise an unmanned aerial vehicle or an Internet of Things (IoT) device.

11. A system for implementing a constrained-action partially-observable Markov decision process (CA-POMDP), comprising:
    at least one computing device; and
    program instructions executable in the at least one computing device that, when executed, direct the at least one computing device to:
      generate an unconstrained policy through execution of a partially observable Markov decision process (POMDP) routine;
      generate an optimal constrained policy by a discrete and combinatorial optimization routine that applies at least one transformation to a finite state controller, the optimal constrained policy generated comprising an optimal finite state controller having a threshold probability of operating within at least one operational constraint within a period of time;
      apply a probabilistic constraint satisfaction routine to bring the optimal finite state controller within a probabilistic constraint satisfaction threshold; and
      determine to perform an action based at least in part on a current state of the at least one computing device and the optimal finite state controller.

12. The system of claim 11, wherein the at least one operational constraint comprises at least one of: bandwidth, battery power, or a computing resource.

13. The system of claim 11, wherein a policy iteration routine comprises applying the at least one transformation until a predetermined epsilon convergence is observed by:
   selecting an epsilon value for detecting convergence of the unconstrained policy to the optimal constrained policy;
   evaluating the unconstrained policy by solving a Linear Programming formulation for the epsilon value of the unconstrained policy;
   improving the unconstrained policy by applying a dynamic-programming update that generates a new set of candidate machine states for the unconstrained policy;

comparing a first plurality of vectors of the new set of candidate machine states to a second plurality of vectors of the unconstrained policy; and modifying a finite state controller of the unconstrained policy until the optimal finite state controller is determined.

14. The system of claim 11, wherein the probabilistic constraint satisfaction routine comprises modifying the optimal finite state controller to probabilistically satisfy at least one soft constraint by:

performing a branch-and-bound (BnB) routine to determine a set of constraint states to introduce into the optimal finite state controller;

introducing a plurality of constraint states into the optimal finite state controller; and search for a correct probability or a percentage of edges to redirect for a solution that satisfies at least one probabilistic constraint while minimizing impact to a value of the optimal finite state controller, the value determined using a value function.

15. The system of claim 14, wherein the at least one computing device is further directed to perform a sampling of the finite state controller and estimate resource utilization through a Markov chain Monte Carlo (MCMC) Metropolis-Hastings routine based on the sampling.

16. The system of claim 11, further comprising an autonomous device, the autonomous device comprising at least one microcontroller configured to oversee operation of the autonomous device, the at least one computing device being a component of the autonomous device.

17. The system of claim 16, wherein the autonomous device further comprises at least one sensor and a network communication module.

18. The system of claim 17, wherein the action comprises at least one of: collecting sensor data using the at least one sensor; communicating the sensor data to another computing device; or moving from a first location to a second location.

19. The system of claim 18, wherein the autonomous device is a first one a plurality of autonomous devices in the system, the another computing device comprising a second one of the plurality of autonomous devices.

20. The system of claim 18, wherein at least a portion of the autonomous devices comprise an unmanned aerial vehicle or an Internet of Things (IoT) device.

* * * * *